(12) United States Patent
Dobashi

(10) Patent No.: US 7,239,725 B2
(45) Date of Patent: Jul. 3, 2007

(54) FACE IMAGE RECOGNITION APPARATUS

(75) Inventor: Hironori Dobashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 663 days.

(21) Appl. No.: 10/205,359

(22) Filed: Jul. 26, 2002

(65) Prior Publication Data

US 2003/0185423 A1  Oct. 2, 2003

(30) Foreign Application Priority Data

Jul. 27, 2001 (JP) .............................. 2001-228346
May 14, 2002 (JP) .............................. 2002-138513

(51) Int. Cl.
- G06K 9/00 (2006.01)
- G06K 19/00 (2006.01)
- G06K 5/00 (2006.01)
- G05B 19/00 (2006.01)
- G05B 23/00 (2006.01)
- G06F 7/00 (2006.01)
- G06F 7/04 (2006.01)
- G08B 29/00 (2006.01)
- G08C 19/00 (2006.01)
- H04B 1/00 (2006.01)
- H04B 3/00 (2006.01)
- H04L 9/14 (2006.01)
- H04L 9/32 (2006.01)
- H04Q 1/00 (2006.01)
- H04Q 9/00 (2006.01)

(52) U.S. Cl. ...................... 382/118; 340/5.2; 340/5.82; 235/382

(58) Field of Classification Search .................. 382/118
See application file for complete search history.

(56) References Cited

U.S. PATENT DOCUMENTS

| | | | | | |
|---|---|---|---|---|---|
| 4,712,103 | A | * | 12/1987 | Gotanda | 340/5.53 |
| 4,975,969 | A | * | 12/1990 | Tal | 382/116 |
| 5,497,430 | A | * | 3/1996 | Sadovnik et al. | 382/156 |
| 5,901,238 | A | * | 5/1999 | Matsushita | 382/117 |
| 6,045,039 | A | | 4/2000 | Stinson et al. | |
| 6,108,437 | A | * | 8/2000 | Lin | 382/118 |
| 6,111,517 | A | * | 8/2000 | Atick et al. | 340/5.83 |

(Continued)

FOREIGN PATENT DOCUMENTS

JP  7-312711  5/1994

(Continued)

OTHER PUBLICATIONS

U.S. Appl. No. 09/814,012, filed Mar. 22, 2001, Dobashi et al.
U.S. Appl. No. 10/091,569, filed Mar. 7, 2002, Dobashi.
U.S. Appl. No. 10/226,329, filed Aug. 23, 2002, Sukegawa et al.
U.S. Appl. No. 10/153,641, filed May 24, 2002, Okazaki et al.

(Continued)

*Primary Examiner*—Bhavesh M Mehta
*Assistant Examiner*—Damon M. Conover
(74) *Attorney, Agent, or Firm*—Pillsbury Winthrop Shaw Pittman, LLP

(57) ABSTRACT

A ten-key section which is used to input identification information such as a password or ID number is disposed on the lower right side of or directly below a camera so that the hand of a to-be-recognized person who inputs identification information such as a password or ID number will not obstruct inputting of a face image

12 Claims, 14 Drawing Sheets

U.S. PATENT DOCUMENTS

| | | | |
|---|---|---|---|
| 6,121,953 A | * | 9/2000 | Walker ........................ 345/156 |
| 6,128,398 A | * | 10/2000 | Kuperstein et al. ......... 382/118 |
| 6,160,903 A | * | 12/2000 | Hamid et al. ............... 382/115 |
| 6,230,148 B1 | | 5/2001 | Pare, Jr. et al. |

FOREIGN PATENT DOCUMENTS

| | | | |
|---|---|---|---|
| JP | 10-134188 | | 11/1996 |
| JP | 11-167632 | | 12/1997 |
| JP | 11-191856 | | 12/1997 |
| JP | 10003339 A | * | 1/1998 |
| JP | 11-316836 | | 5/1998 |
| JP | 11-175718 | | 7/1999 |
| JP | 2001-005836 | | 1/2001 |

OTHER PUBLICATIONS

Seitz et al., "The digital doorkeeper—Automatic face recognition with the computer," Proceedings of the Annual International Carnahan Conference on Security Technology, IEEE, Oct. 1-3, 1991, pp. 77-83, XP010048981, ISBN: 0-7803-0120-X.

Fukui et al., "Facial Feature Point Extraction Method Based on Combination of Shape Extraction and Pattern Matching," Study Papers of Institute of Electronic Information and Communication Engineers, vol. J80-D-11, No. 8, pp. 2170-2177 (1997).

Maeda et al., "A Pattern Matching Method with Local Structure," Study Papers of Institute of Electornic Information and Communication Engineers, vol. J68-D, No. 3, pp. 345-352 (1985).

* cited by examiner

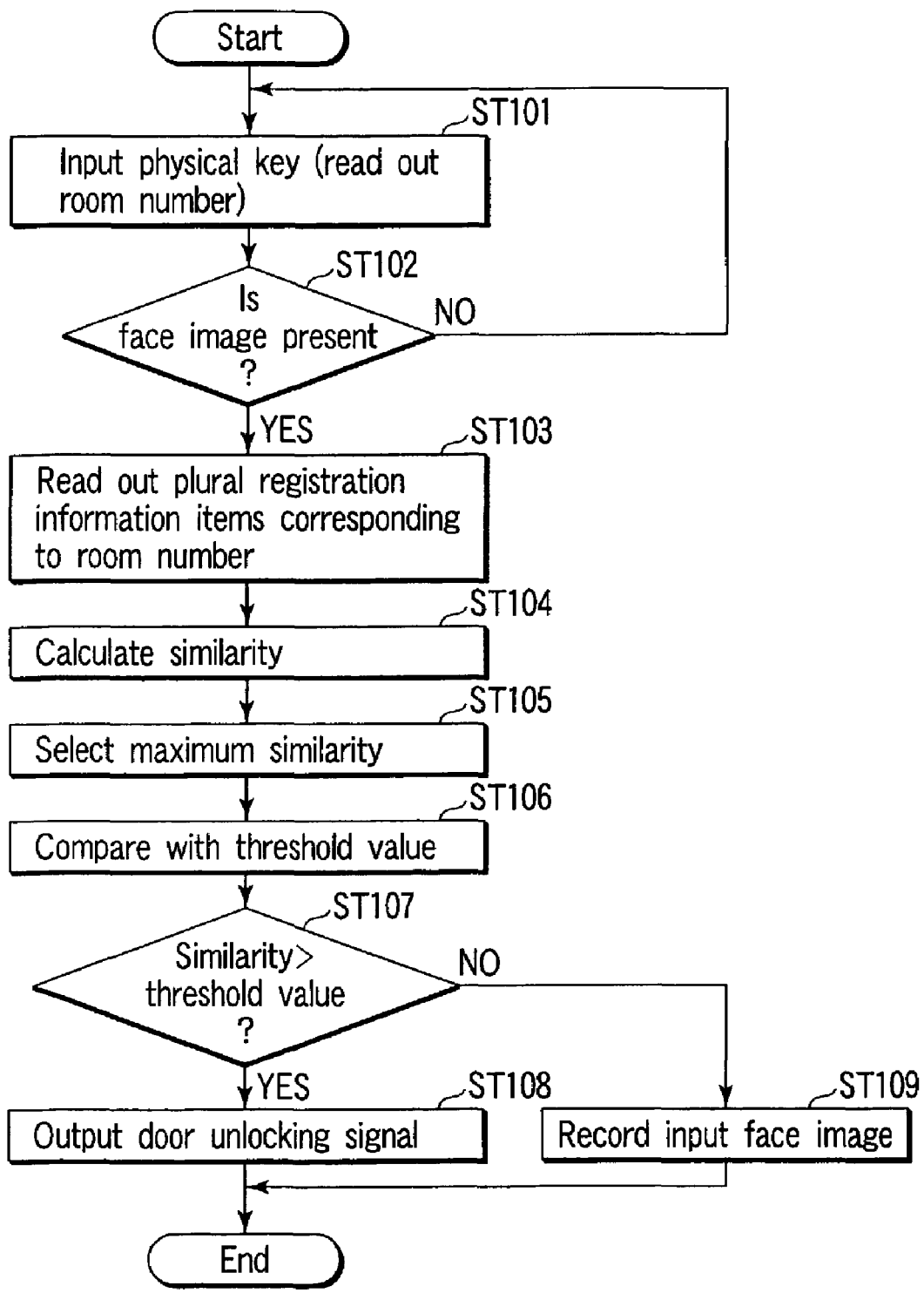
F I G. 30

FACE IMAGE RECOGNITION APPARATUS

CROSS-REFERENCE TO RELATED APPLICATIONS

This application is based upon and claims the benefit of priority from the prior Japanese Patent Applications No. 2001-228346, filed Jul. 27, 2001; and No. 2002-138513, filed May 14, 2002, the entire contents of both of which are incorporated herein by reference.

BACKGROUND OF THE INVENTION

1. Field of the Invention

This invention relates to a face image recognition apparatus which recognizes the face image of a person for security management or the like and a passage control apparatus which controls the passage of a passer by use of the face image recognition apparatus.

2. Description of the Related Art

The face image recognition apparatus is used to recognize the face image of a person for security management or the like. An example of the conventional face image recognition apparatus is disclosed in Jpn. Pat. Appln. KOKAI Publication No. 2001-5836, for example. In the face image recognition apparatus disclosed in Jpn. Pat. Appln. KOKAI Publication No. 2001-5836, feature information items of the face images of registrants are previously registered in correspondence to identification information items in a dictionary. A to-be-recognized person who uses the face image recognition apparatus inputs his own identification information (such as an ID number). Then, the face image recognition apparatus specifies feature information corresponding to the identification information input by the to-be-recognized person in the dictionary and inputs the face image of the to-be-recognized person. After specifying the feature information corresponding to the identification information and inputting the face image of the to-be-recognized person, the face image recognition apparatus collates feature information extracted from the input face image with the feature information specified in the dictionary based on the identification information and performs the recognition process for the face image of the to-be-recognized person.

Thus, in the conventional face image recognition apparatus, a method for permitting the to-be-recognized person to input his own identification information and specify registration information (feature information) registered in the dictionary is used. For example, in the conventional face image recognition apparatus disclosed in Jpn. Pat. Appln. KOKAI Publication No. 2001-5836, identification information of the to-be-recognized person is input by use of a key input section such as a keyboard or card reader. Further, in the conventional face image recognition apparatus, registration information is specified in the dictionary and the face image of the to-be-recognized person is input by use of the image input section after input of identification information by the to-be-recognized person is completed.

BRIEF SUMMARY OF THE INVENTION

However, in the conventional face image recognition apparatus, the hand or the like of the to-be-recognized person who inputs identification information may obstruct inputting of the face image in some cases when the image input section inputs the face image. Accordingly, an object of this invention is to provide a face image recognition apparatus and passage control apparatus which permits a face image to be stably input without causing the hand or the like of the to-be-recognized person to obstruct inputting of the face image by the image input section when the to-be-recognized person inputs identification information by use of the key input section.

Further, in the conventional face image recognition apparatus, a psychological oppression sensation is given to the to-be-recognized person in some cases since he becomes aware of the presence of the image input section. Accordingly, an object of this invention is to provide a face image recognition apparatus and passage control apparatus which permits a face image of the to-be-recognized person to be input without causing the to-be-recognized person to become aware of the presence of the image input section.

Further, in the conventional face image recognition apparatus, since registration information is specified in the dictionary after inputting of identification information by the to-be-recognized person is completely ended, it will take a long time until the recognition result is output. Accordingly, an object of this invention is to provide a face image recognition apparatus, passage control apparatus, face image recognition method and passage control method which can reduce the processing time from the start of input of identification information by the to-be-recognized person until the recognition result is output.

A face image recognition apparatus of this invention which recognizes a person based on a face image, comprises an image input section which inputs a face image of a to-be-recognized person, an illuminating section which applies light toward at least a face of the to-be-recognized person, a feature amount extracting section which extracts a feature amount of the face of the to-be-recognized person based on the face image input by the image input section, a feature amount registration section in which a reference feature amount is previously registered in correspondence to identification information of the to-be-recognized person, a key input section which is disposed below the image input section as viewed from the to-be-recognized person and permits the to-be-recognized person to input his own identification information, and a recognition section which recognizes the face image of the to-be-recognized person by collating a feature amount extracted by the feature amount extracting section with a reference feature amount corresponding to identification information and acquired from the feature amount registration section based on the identification information input by the key input section.

A face image recognition apparatus of this invention which recognizes a person based on a face image, comprises a key input section which permits a to-be-recognized person to input his own identification information, an image input section which is disposed inside the key input section and inputs a face image of the to-be-recognized person, an illuminating section which applies light toward at least a face of the to-be-recognized person, a feature amount extracting section which extracts a feature amount of the face of the to-be-recognized person based on the face image input by the image input section, a feature amount registration section in which a reference feature amount is previously registered in correspondence to identification information of the to-be-recognized person, and a recognition section which recognizes the face image of the to-be-recognized person by collating a feature amount extracted by the feature amount extracting section with a reference feature amount corresponding to identification information and acquired from the feature amount registration section based on the identification information input by the key input section.

A face image recognition apparatus of this invention which recognizes a person based on a face image, comprises an image input section which inputs a face image of a to-be-recognized person, a feature amount extracting section which extracts a feature amount of the face of the to-be-recognized person based on the face image input by the image input section, a feature amount registration section in which a reference feature amount corresponding to identification information of the to-be-recognized person is previously registered as registration information, a key input section which permits the to-be-recognized person to input his own identification information configured by characters of plural digits, and a recognition section which recognizes the face image of the to-be-recognized person by collating the face feature amount extracted by the feature amount extracting section with a reference feature amount acquired as registration information of a number reduced and selected from the feature amount registration section based on identification information of the number of digits input by the key input section each time the identification information is input by one digit by the key input section.

A passage control apparatus of this invention which recognizes a face image of a passer and controls the passage of the passer, comprises an image input section which inputs a face image of a passer, an illuminating section which applies light toward at least a face of the passer, a feature amount extracting section which extracts a face feature amount of the passer based on the face image input by the image input section, a feature amount registration section in which a reference feature amount is previously registered in correspondence to identification information of the passer, a key input section which is disposed below the image input section as viewed from the passer and permits the passer to input his own identification information, a recognition section which recognizes the face image of the passer by collating a feature amount extracted by the feature amount extracting section with a reference feature amount corresponding to identification information input by the key input section and acquired from the feature amount registration section based on the identification information, and a passage control section which controls the passage of the passer based on the recognition result of the recognition section.

A passage control apparatus of this invention which recognizes a face image of a passer and controls the passage of the passer, comprises a key input section which permits the passer to input his own identification information, an image input section which is disposed inside the key input section and inputs a face image of a passer, an illuminating section which applies light toward at least a face of the passer, a feature amount extracting section which extracts a face feature amount of the passer based on the face image input by the image input section, a feature amount registration section in which a reference feature amount is previously registered in correspondence to identification information of the passer, a recognition section which recognizes the face image of the passer by collating a feature amount extracted by the feature amount extracting section with a reference feature amount corresponding to identification information input by the key input section and acquired from the feature amount registration section based on the identification information, and a passage control section which controls the passage of the passer based on the recognition result of the recognition section.

A passage control apparatus of this invention which recognizes a face image of a passer and controls the passage of the passer, comprises an image input section which inputs a face image of a passer, a feature amount extracting section which extracts a face feature amount of the passer based on the face image input by the image input section, a feature amount registration section in which reference feature amounts corresponding to identification information items of registrants are previously registered as registration information, a key input section which permits the passer to input his own identification information configured by characters of plural digits, and a recognition section which recognizes the face image of the passer by collating the face feature amount extracted by the feature amount extracting section with a reference feature amount acquired as registration information of a number reduced and selected from the feature amount registration section based on identification information of the number of digits input by the key input section each time the identification information is input by one digit by the key input section.

A passage control apparatus of this invention which recognizes a face image of a visitor and controls the open/close state of an entrance/exit door of a visiting destination based on the recognition result, comprises an image input section which inputs at least a face image of a visitor, an illuminating section which applies light toward at least a face of the visitor, a feature amount extracting section which extracts a face feature amount of the visitor based on the face image input by the image input section, a feature amount registration section in which a reference feature amount is previously registered in correspondence to identification information of the visiting destination, a key input section which is disposed below the image input section as viewed from the visitor and permits the visitor to input the identification information of the visiting destination, a recognition section which recognizes the face image of the visitor by collating a feature amount extracted by the feature amount extracting section with a reference feature amount corresponding to identification information input by the key input section and acquired from the feature amount registration section based on the identification information, and a door control section which controls the open/close state of the entrance/exit door of the visiting destination based on the recognition result of the recognition section.

A face image recognition method of this invention used in a face image recognition apparatus including a feature amount registration section in which identification information configured by characters of plural digits assigned to at least one registrant and a reference feature amount of at least one registrant corresponding to the identification information are previously registered as registration information, comprises inputting a face image of a to-be-recognized person, extracting a face feature amount of the to-be-recognized person based on the input face image, permitting the to-be-recognized person to input his own identification information configured by characters of plural digits for each digit by use of an operation key, and recognizing the face image of the to-be-recognized person by collating the face feature amount extracted based on the input face image with a reference feature amount as registration information of a number reduced and selected from the feature amount registration section based on identification information of the number of digits input each time the identification information is input by one digit by use of the operation key.

A passage control method of this invention used in a passage control apparatus including a feature amount registration section in which identification information configured by characters of plural digits assigned to at least one person who is permitted to pass through and a reference feature amount of at least one person corresponding to the identification information are previously registered as registration information, comprises inputting a face image of a passer, extracting a face feature amount of the passer based on the input face image, permitting the passer to input his own identification information configured by characters of plural digits for each digit by use of an operation key, recognizing the face image of the passer by collating the face feature amount extracted based on the input face image with a reference feature amount as registration information of a number reduced and selected from the feature amount registration section based on identification information of the number of digits input by use of the operation key each time the identification information is input by one digit by use of the operation key, and controlling the passage of the passer based on the recognition result obtained by the recognizing the face image of the passer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 30 is a flowchart for illustrating the recognition process of the recognition section according to the fourth embodiment.

DETAILED DESCRIPTION OF THE INVENTION

There will now be described embodiments of this invention with reference to the accompanying drawings.

First, a first embodiment of this invention is explained.

Figure 1:
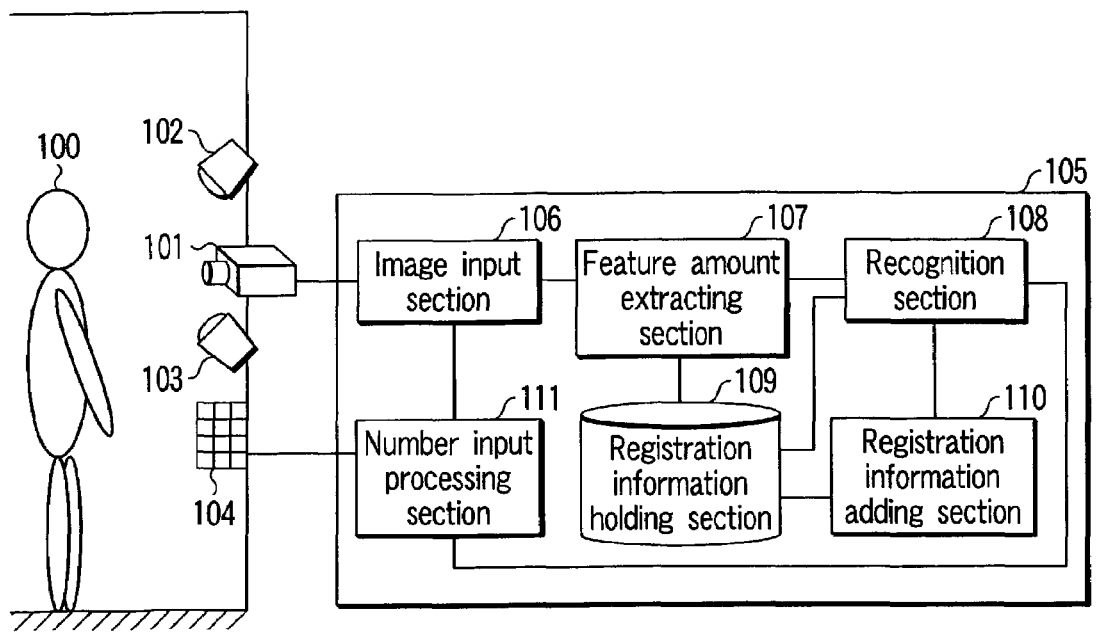
FIG. 1 is a configuration diagram schematically showing the configuration of a face image recognition apparatus according to a first embodiment of this invention.

FIG. 1 schematically shows the configuration of a face image recognition apparatus according to the first embodiment. The face image recognition apparatus includes a camera 101, first illuminating section 102, second illuminating section 103, ten-key section 104 and processing section 105.

The camera 101 is used to photograph and input a face image (which is an image including at least the face) of a to-be-recognized person 100. For example, the camera 101 is configured by a television camera using an imaging device such as a CCD sensor.

The first illuminating section 102 applies light toward at least the face of the to-be-recognized person 100 with constant illuminance in an oblique direction from the upper right side or upper left side of the camera 101. The second illuminating section 103 applies light toward at least the face of the to-be-recognized person 100 with constant illuminance in an oblique direction from below the camera 101.

The ten-key section 104 is operated to input an ID number (or a password) used as identification information of the to-be-recognized person 100. The processing section 105 processes a face image input from the camera 101 and an ID number input from the ten-key section 104 and performs the recognition process or the like for the face image.

Next, the first illuminating section 102 and second illuminating section 103 are explained in detail.

Figure 2:
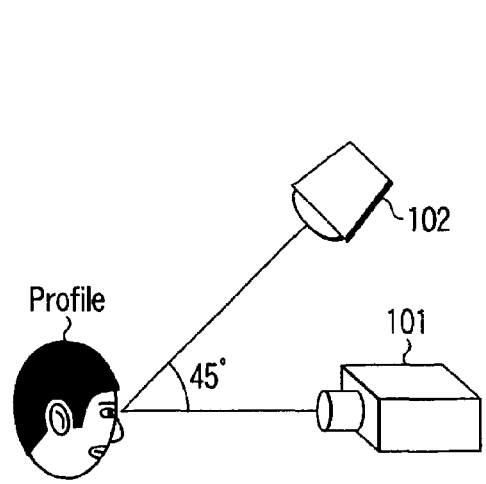
FIG. 2 is a side view showing the relation between a first illuminating section and a camera.
Figure 3:
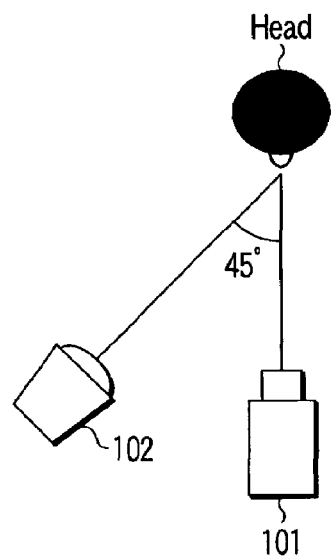
FIG. 3 is a top view showing the relation between the first illuminating section and the camera.

The first illuminating section 102 is an illuminating unit such as a fluorescent light which applies light toward at least the face of the to-be-recognized person 100 with constant illuminance in an oblique direction from the upper right side or upper left side of the camera 101. As shown in FIGS. 2 and 3, the first illuminating section 102 is disposed to make an angle of 450 between the optical axis of the first illuminating section 102 and the optical axis of the camera 101. The first illuminating section 102 may be disposed in such a condition that the angle between the optical axis of the first illuminating section 102 and the optical axis of the camera 101 is 30° or less, for example.

Figure 4:
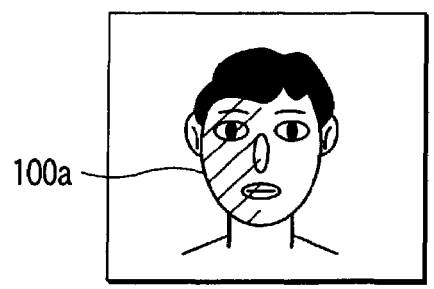
FIG. 4 is a view showing an example of a face image to be photographed by use of the first illuminating section.

That is, the first illuminating section 102 forms the shadows of parts of the face (such as a nose and eyes) on the half portion of the face (hatched portion 100a of FIG. 4) by applying direct light toward the face of the to-be-recognized person 100 as shown in FIG. 4. In this case, diffusion light or indirect light can be used instead of the direct light as light from the first illuminating section 102 and the same effect can be attained if the shadow can be formed on the half portion of the face.

Figure 5:
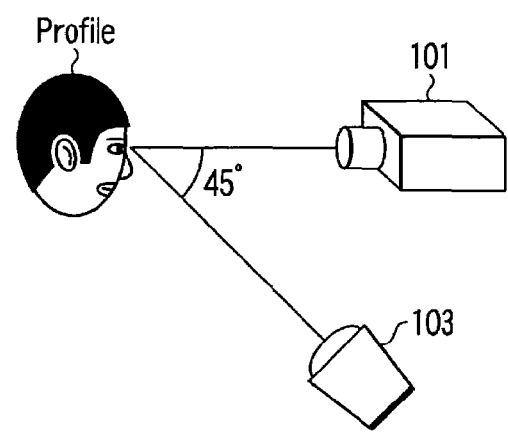
FIG. 5 is a side view showing the relation between a second illuminating section and the camera.

The second illuminating section 103 is an illuminating unit such as a fluorescent light which applies light toward at least the face of the to-be-recognized person 100 with constant illuminance in an oblique direction from below the camera 101. As shown in FIG. 5, the second illuminating section 103 is disposed to make an angle of 45° between the optical axis of the second illuminating section 103 and the optical axis of the camera 101. The second illuminating section 103 may be disposed in such a condition that the angle is set in a range of 30° and 60° (including both limits), for example. It is sufficient only if direct light from the second illuminating section 103 is applied toward the face of the to-be-recognized person 100. In this case, diffusion light or indirect light can be used instead of the direct light as light from the second illuminating section 103 if it is the same type as light from the first illuminating section 102.

Next, the relation between the first illuminating section 102 and the second illuminating section 103 is explained. Illuminance 1A of light from the first illuminating section 102 and illuminance 2A of light from the second illuminating section 103 satisfy the relation of $1A \geq 2A$.

A shadow is formed on the half portion of the face image of the to-be-photographed person 100 by use of the two illuminating sections (first illuminating section 102, second illuminating section 103). That is, the illuminance 1A of light from the first illuminating section 102 is higher than the illuminance 2A of light from the second illuminating section 103 according to the above relation. Therefore, the shadow on the half portion of the face image of the to-be-recognized person 100 formed by light from the first illuminating section 102 appears more strongly than the shadow formed by light from the second illuminating section 103. The shadow on the half portion of the face image of the to-be-recognized person 100 clearly and satisfactorily expresses information of unevenness on the face of each person (face feature information of each person). Thus, by emphasizing the shadow of the half portion of the face image, the face feature amount extracted from the face image emphasizes the difference between individuals. As a result, the recognition rate of the face image is enhanced.

Light from the second illuminating section 103 suppresses light from the first illuminating section 102 from forming an excessively strong shadow on the face of the to-be-recognized person 100 based on the above relation. That is, if only the first illuminating section 102 is used, the way of forming a shadow on the face is different according to a variation in the distance between the to-be-recognized person 100 and the camera 101 at the recognition time and at the registration time. However, a lowering in the recognition rate due to a subtle difference in formation of the shadow can be suppressed by using the second illuminating section 103.

In a case where the position of the face of a person and the position of the camera 101 are kept substantially unchanged at the recognition time and at the registration time, the second illuminating section 103 can be omitted. This is because the shape of the shadow formed on the face image is substantially the same if the position of the face of a person and the position of the camera 101 are kept substantially unchanged at the recognition time and at the registration time. For example, if the standing position of a person is fixed or the guidance function which displays the size of the face image at the registration time by use of a circular mark or the like is used, the distance between and a horizontal deviation in the position of the face of a person and the position of the camera 101 at the recognition time are kept substantially the same as the distance between and a horizontal deviation in the position of the face of a person and the position of the camera 101 at the registration time. Therefore, the second illuminating section 103 can be omitted.

Assume now that the total value of the illuminance 1A of light from the first illuminating section 102 and the illuminance 2A of light from the second illuminating section 103 which illuminate the face of the to-be-recognized person 100 is B lux (lx). Further, assume that the illuminance by external light or the like which is applied to the face of the to-be-recognized person 100 is C lux (lx). In this case, if the relation of $1A+2A=B>C$ is established, the influence by external light can be suppressed. For example, if it is required to suppress the influence by a ceiling light such as a fluorescent light which lies on the upper rear side of the to-be-recognized person 100, the illuminance of light from the first illuminating section 102 and the illuminance of light from the second illuminating section 103 may be so set as to establish the above relation. Further, the total illuminance B (lx) of the illuminance 1A of light from the first illuminating section 102 and the illuminance 2A of light from the second illuminating section 103 is defined in a range so as to prevent the input face image from being set into the saturated state.

It is assumed that the first illuminating section 102 and second illuminating section 103 are always set in the ON state, but it is also possible to turn ON the first illuminating section 102 and second illuminating section 103 only when the to-be-recognized person 100 comes near the present apparatus. In this case, for example, this can be attained by additionally providing a human sensor such as an infrared sensor on the present apparatus and causing the human sensor to sense the to-be-recognized person 100 who comes near the present apparatus and turn ON the first illuminating section 102 and second illuminating section 103. Further, it is possible to sense a to-be-recognized person 100 who comes near the present apparatus by detecting a moving body based on an image input from the camera 101.

Next, the processing section 105 is explained.

The processing section 105 can be configured by a computer, for example. The processing section 105 is operated based on a control program to realize various functions. The control program is stored in a storage medium such as a hard disk, CD-ROM, MD or FD.

In the following explanation, various information items including image input data, extracted feature amount, partial space, inherent vector configuring a partial space, correlation matrix, status information such as time, date and location of registration, individual information such as a password, ID number are used. Further, in the following explanation, data to be recognized contains a partial space or inherent vector configuring a partial space. In addition, in the following explanation, registration information contains image input data, extracted feature amount, partial space, inherent vector configuring a partial space, correlation matrix, status information and individual information. Therefore, the recognition data is contained in the registration information.

An example of the concrete configuration of the processing section 105 is explained below in detail with reference to FIG. 1. The processing section 105 includes an image input section 106 used as image input means, a feature amount extracting section 107 used as feature amount extracting means, a recognition section 108 used as recognition means, a registration information holding section (dictionary) 109 used as feature amount registration means, a registration information adding section 110 used as feature amount adding means, and a number input processing section 111.

The image input section 106 is supplied with a face image from the camera 101, A/D-converts the input face image into a digital form and then supplies the digital face image to the feature amount extracting section 107.

In the registration information holding section 109, registration information items such as reference feature amounts corresponding to ID numbers of to-be-recognized persons 100 are previously registered (stored).

When the recognition rate of the recognition section 108 becomes lower than a preset value, the registration information adding section 110 additionally registers registration information such as a reference feature amount (a new reference feature amount) which is obtained from the face image input at this time into the registration information holding section 109.

The number input processing section 111 processes an ID number input by use of the ten-key section 104.

Figure 6:
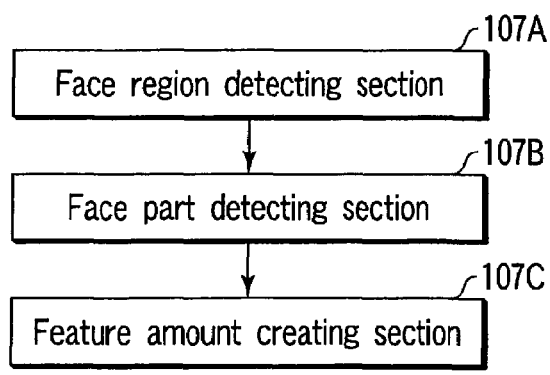
FIG. 6 is a block diagram schematically showing the configuration of a feature amount extracting section.

The feature amount extracting section 107 extracts a feature amount such as partial space information or light and shade information by use of the face image of the to-be-recognized person 100 supplied from the image input section 106. For example, as shown in FIG. 6, the feature amount extracting section 107 includes a face region detecting section 107A, face part detecting section 107B and feature amount creating section 107C. The feature amount extracting section 107 is explained below in detail with reference to FIG. 6.

The face region detecting section 107A detects a face region based on a face image input from the camera 101. For example, with the face region detecting section 107A, a previously prepared template is moved in the image to derive correlation values and a location in which the largest correlation value is obtained is detected as a face region. The face region detecting section 107A can be used to detect a face region by use of a face region extracting method which utilizes a partial space method or inherent space method.

The face part detecting section 107B detects the positions of the nose and eyes from parts of the detected face region. For example, the face part detecting section 107B detects the positions of the face parts (parts of the face such as the nose and eyes) based on face feature points by use of a method disclosed in a document ("Face Feature Point Extraction by Combination of Shape Extraction and Pattern Collation" by Kazuhiro Fukui, Osamu Yamaguchi, Study Papers of Institute of Electronic Information and is Communication Engineers (D), vol. J80-D-II, No. 8, pp. 2170 to 2177 (1997)).

The feature amount creating section 107C extracts a face region of a preset size and shape based on the positions of the face parts detected by the face part detecting section 107B and uses light and shade information thereof as a feature amount. In this case, for example, the feature amount creating section 107C uses the light and shade value of a region of m pixels×n pixels as a feature amount and uses the feature amount as a feature vector of m×n dimension.

Further, in a case where the mutual partial space method is used in the recognition section 108, the feature amount creating section 107C creates the feature amount by the following procedure. For example, the mutual partial space method is a known recognition method described in a document ("Pattern Matching Method using Local Configuration" by Kenichi Maeda, Sadaichi Watanabe, Study Papers of Institute of Electronic Information and Communication Engineers (D), vol. J68-D, No. 3, pp. 345 to 352 (1985)).

When the mutual partial space method is used as the recognition method, the feature amount creating section 107C first derives a feature amount as a feature vector of m×n dimension. Then, the feature amount creating section 107C derives a correlation matrix (or covariance matrix) of the thus calculated feature vector and derives a normal orthogonal vector by use of K-L expansion with respect to the correlation matrix. Thus, the feature amount creating section 107C calculates a partial space. The partial space is expressed by selecting k inherent vectors corresponding to inherent values in an order from the largest inherent value and using the set of inherent vectors.

In the present embodiment, the feature amount creating section 107C derives a correlation matrix Cd from the feature vector and derives a matrix Φ (of the inherent vectors by diagonalizing the correlation matrix as indicated by the following equation.

$$Cd=\Phi dAd\Phi dT$$

For example, the feature amount creating section 107C derives the correlation matrix of the feature vector based on time series face image data obtained from the input image and derives a normal orthogonal vector by use of the K-L expansion. Thus, the feature amount creating section 107C calculates the partial space. The partial space is registered into the registration information holding section 109 as a recognition dictionary which is used to identify a person. For example, the partial space derived from the face image of a to-be-recognized person is previously registered in the dictionary as the feature amount of the to-be-recognized person.

Further, as will be described later, the partial space itself may be used as input data which is used to perform the recognition process. Therefore, the result of calculation of the partial space is supplied to the recognition section 108 and registration information holding section 109.

The recognition section 108 collates (compares) registration information (containing partial spaces) registered in the registration information holding section 109 with a feature amount (light and shade information or partial space information) obtained in the feature amount extracting section 107. Then, the recognition section 108 performs a recognition process to determine who a to-be-recognized person 100 photographed by the camera 101 is or performs an identification process to determine whether the to-be-recognized person 100 photographed by the camera 101 is a specified person or not. In order to permit the recognition section 108 to recognize a person, it is only required to determine one of the features of the persons registered in the dictionary which is most similar to the feature amount extracted from the face image photographed by the camera 101. Therefore, when a person is recognized, the recognition section 108 calculates the similarities between the feature amount extracted from the face image photographed by the camera 101 and all of the feature amounts registered in the dictionary and determines a person with the feature amount which gives the largest similarity as the recognition result.

Further, when a person is identified based on the face image by specifying the person by use of individual information of a card, password, ID number or key, the recognition section 108 calculates the similarity between the feature amount registered in the dictionary corresponding to the individual information and the feature amount extracted from the face image photographed by the camera 101. Further, the recognition section 108 compares the calculated similarity with a preset threshold value and recognizes (identifies) that the person is a corresponding person if the calculated similarity exceeds the preset threshold value.

When the identification process of the person is performed as described above, it is necessary to use means for inputting individual information such as a card, password, ID number, key or the like. For example, as the card, a recording medium such as an IC card, ID card or radio cad on which individual information is recorded can be used. In this case, a card reader to read out individual information which can cope with the recording medium is provided on the present apparatus. Further, if a password or ID number is used as individual information, key input means for permitting the user to input the individual information is provided on the present apparatus. For example, when the password or ID number is used as individual information, key input means such as the ten-key section 104 and number input processing section 111 as will be described later may be used.

Further, in the recognition section 108, a recognition method such as a partial space method, multiple similarity method or the like is used by use of information of the feature amount extracting section 107.

Now, a recognition method based on the mutual partial space method is explained. In this case, in the mutual partial space method, it is assumed that the feature amount as registration information previously registered in the dictionary and the feature amount extracted from an image (input data) photographed by the camera 101 are each expressed as a partial space. Further, an "angle" made by the two partial spaces is defined as the similarity. In this case, a partial space as the feature amount extracted from the image photographed by the camera 101 is defined as an input partial space.

First, a correlation matrix Cin is derived with respect to an input data string in the same manner as described above and an inherent vector Φin is derived by diagonalizing the correlation matrix as indicated by the following equation.

$$Cin = \Phi in \, Ain \, \Phi inT$$

When the inherent vector Φin is derived, the similarity is calculated based on an "angle" made between a partial space expressed by the inherent vector Φin derived from the input data and a partial space expressed by an inherent vector Φd. Thus, the partial space similarity (0.0 to 1.0) between the partial spaces expressed by the inherent vectors Φin and Φd becomes the similarity used as a recognition result.

Figure 7:
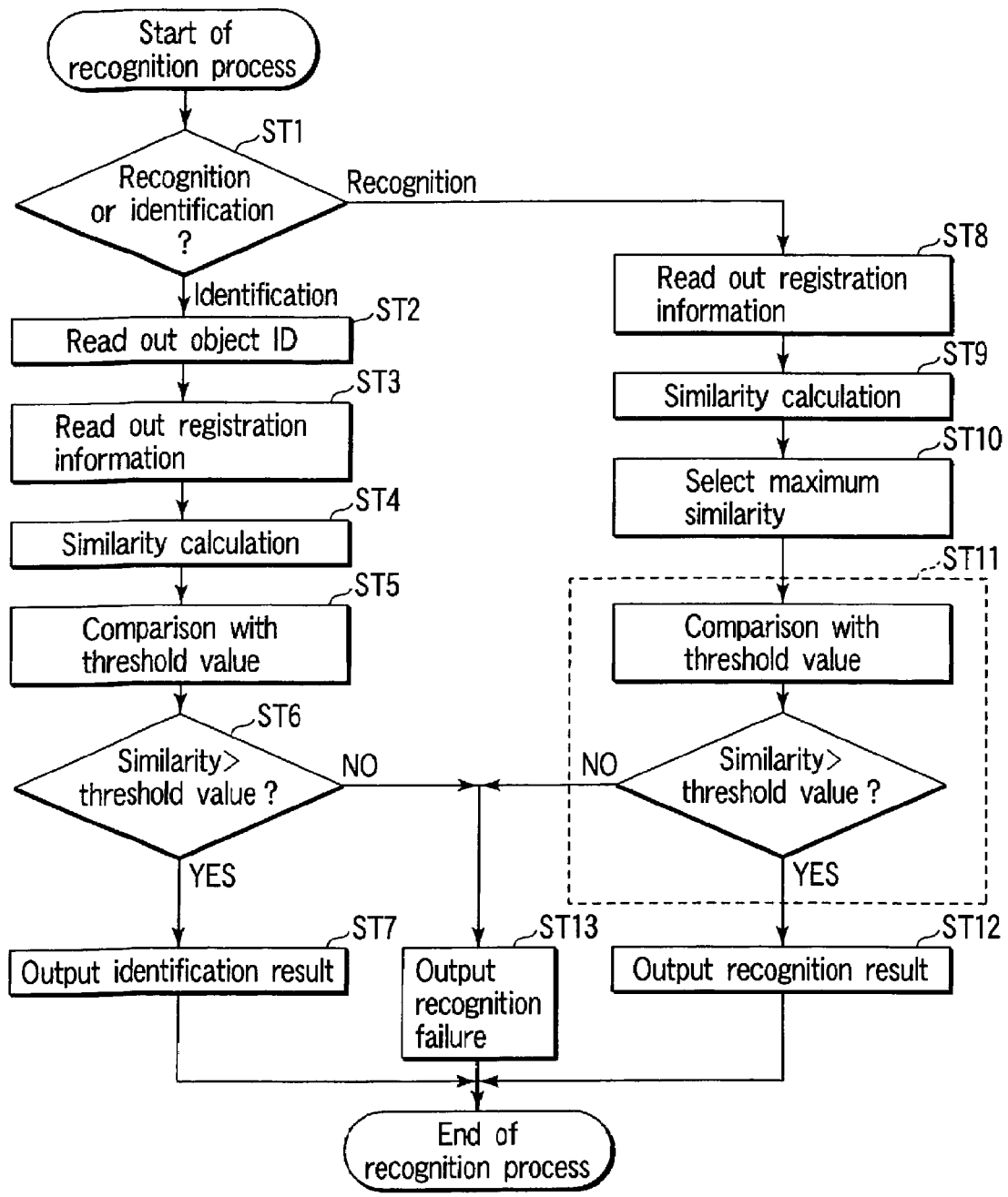
FIG. 7 is a flowchart for illustrating the recognition process of a recognition section.

The recognition section 108 is operated as shown in the flowchart of FIG. 7. First, the operation of the recognition section 108 is different depending on whether it performs the recognition process or the identification process (step ST1). If the identification process is performed, an object ID number of a to-be-recognized person is read out by use of the number input processing section (step ST2). Then, registration information (partial space) corresponding to the object ID number is read out from the registration information holding section 109 (step ST3).

Next, as described above, in order to perform the recognition process by use of the partial space method or the like, the recognition section 108 calculates the similarity between the partial space of each registration information and an input partial space or a partial space used as the feature amount extracted from the image photographed by the camera 101 by use of the feature amount extracting section 107 (step ST4). Then, the recognition section 108 compares the calculated similarity with a preset threshold value (steps ST5, ST6) and determines and outputs the result of identification (step ST7). In this case, if the calculated similarity is larger than the preset threshold value, it is determined that the identification can be successfully made and if the calculated similarity is not larger than the preset threshold value, it is determined that the identification cannot be successfully made.

In a case where the recognition process is performed, the recognition section 108 reads out all of registration information items to be recognized from the registration information holding section 109 (step ST8). When all of the registration information items to be recognized are read out, the recognition section 108 calculates the similarities between partial spaces of the respective registration information items and the partial space as the feature amount extracted from the image photographed by the camera 101 (step ST9). After calculating the similarities with the respective registration information items, the recognition section 108 selects the maximum one of the calculated similarities (step ST10) and outputs data indicating a person corresponding to the registration information which gives the maximum similarity as the recognition result (step ST12).

Further, it is also possible for the recognition section 108 to determine (determine by use of a threshold value) whether the maximum similarity is larger than a preset threshold value as shown by the step ST11 surrounded by broken lines in FIG. 7. In this case, whether the recognition result is correct or not can be checked (step ST13). For example, if the maximum similarity is smaller than the preset threshold value, the recognition section 108 determines that the recognition result does not correspond to any one of the to-be-recognized objects.

In the registration information holding section 109, it is possible to register (or store) image input data, extracted feature amounts, status information such as time, date and location of registration and the like as registration information in addition to the partial spaces (or correlation matrices and the like) used to identify a to-be-recognized person).

In the present embodiment, not only a case wherein partial spaces are held, but also a case wherein correlation matrices used in the preceding stage to calculate partial spaces are held is explained.

The registration information holding section 109 holds one registration information for each individual information item such as a person or ID number. In the registration information, the partial space is stored together with attendant information such as time at which the partial space is acquired.

Next, the registration information adding section 110 is explained. The registration information adding section 110 performs a process to additionally register new registration information (reference feature amount) into the registration information holding section 109 when the recognition rate or similarity with respect to specified registration information obtained in the recognition section 108 becomes lower than a preset value. For example, the registration information adding section 110 monitors the recognition result obtained by the recognition section 108. Thus, if the registration information adding section 110 detects that the similarity with respect to specified registration information is lowered, it additionally registers registration information such as a partial space (reference feature amount) as the feature amount obtained from the face image input at this time as new registration information into the registration information holding section 109.

First, the registration information adding section 110 detects whether the recognition rate in the recognition section 108 is lower than a preset value or not. For example, the registration information adding section 110 detects that the similarity is lowed or not by determining whether or not the degree of similarity calculated in the recognition section 108 is lower than a threshold value as a reference value used for determination of additional registration. Then, if the registration information adding section 110 determines that the degree of similarity calculated in the recognition section 108 becomes lower than the reference value used for determination of additional registration, the registration information adding section 110 additionally registers registration information which contains the feature amount extracted by the feature amount extracting section 107 at this time as a new reference feature amount into the registration information holding section 109.

That is, a lowering in the similarity with respect to the specified registration information is determined by previously setting a reference value used for determination of additional registration of registration information and comparing the similarity as the recognition result with the reference value for determination of additional registration. Then, if the similarity as the recognition result becomes smaller than the reference value for determination of additional registration, it is determined that it is necessary to add new recognition information.

Further, the relation between the reference value (Ladd) used for determination of additional registration and the recognition threshold value (Lrec) in the recognition section 108 is required to satisfy the following expression.

$$Ladd \geq Lrec$$

Thus, in a case where a plurality of registration information items are held as reference feature amounts of one person, the recognition section 108 can perform the recognition process based on a plurality of partial spaces corresponding to one person. The reason why a plurality of registration information items are held as the reference feature amounts of one person is that a lowering in the similarity due to a variation in the hair style, beard or makeup or the presence or absence of glasses can be suppressed, for example. That is, by holding a plurality of registration information items, a variation in the face image due to a variation in the standing position or a variation in the face itself can be coped with. Further, since a lowering in the similarity is determined based on the recognition result and new registration information is added, additional registration of registration information can be easily performed while the present apparatus is being operated.

Next, the ten-key section 104 and number input processing section 111 are explained.

The ten-key section 104 is operated by a person to input an ID number or the like when the person is identified based on the face image by specifying the person by use of the ID number (or password or the like). Further, the number input processing section 111 processes the ID number input by the ten-key section 104.

Figure 8:
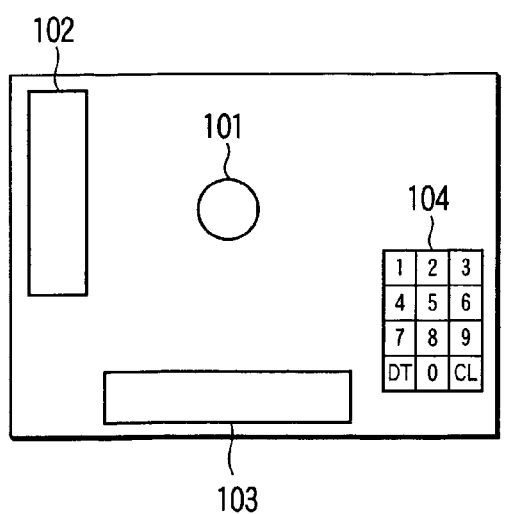
FIG. 8 is a front view showing an example of installation of a ten-key section.

For example, as shown in FIG. 8, the ten-key section 104 is disposed on the lower right side of the camera 101. In the arrangement of the ten-key section 104, the effect that a hand of the person who inputs the ID number by use of the ten-key section 104 will not obstruct inputting of a face image can be attained.

Figure 9:
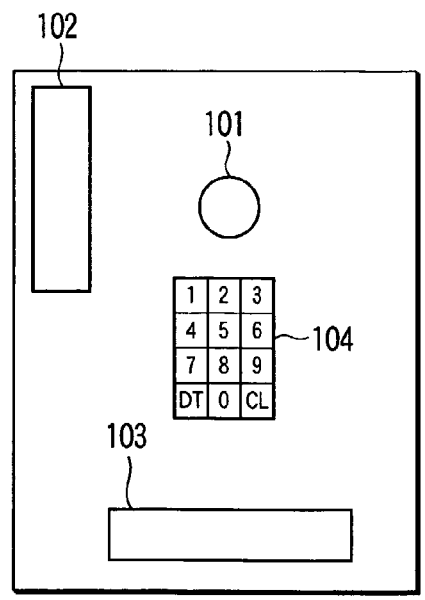
FIG. 9 is a front view showing an example of installation of a ten-key section.
Figure 10:
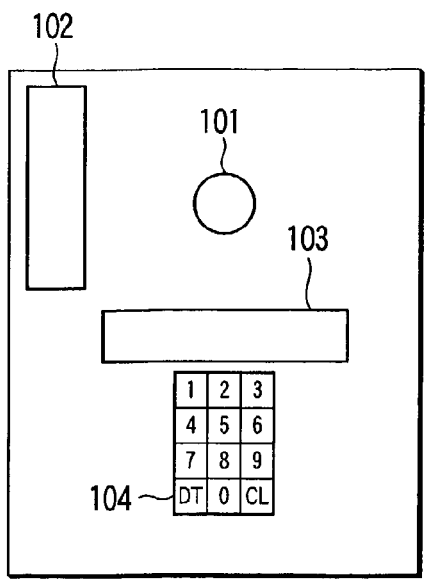
FIG. 10 is a front view showing an example of installation of a ten-key section.
Figure 11:
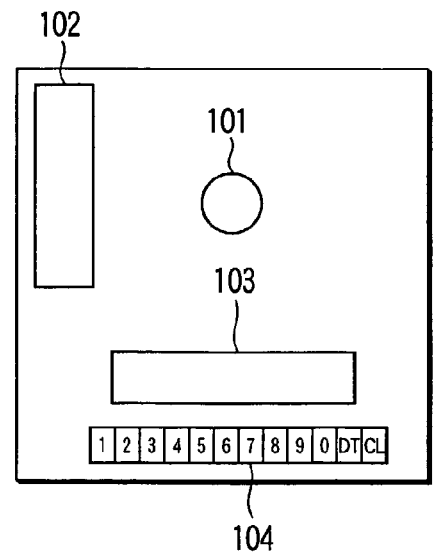
FIG. 11 is a front view showing an example of installation of a ten-key section.
Figure 12:
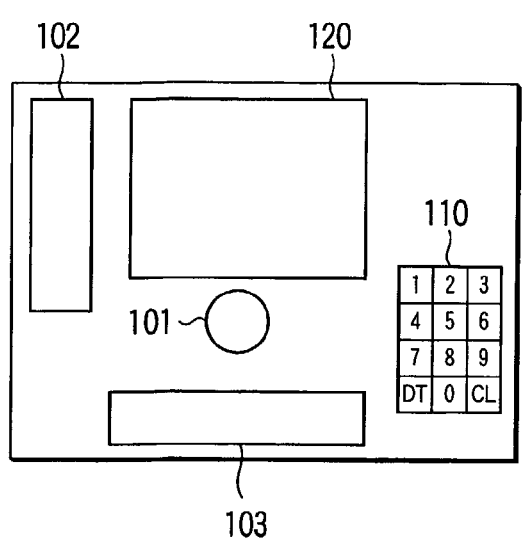
FIG. 12 is a front view showing an example of installation of a unit having a display section.
Figure 13:
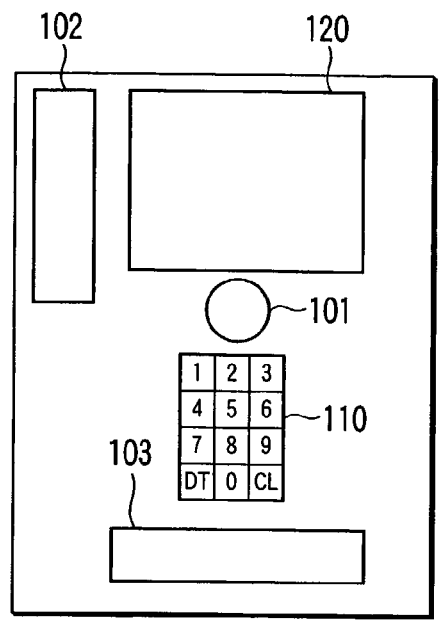
FIG. 13 is a front view showing an example of installation of a unit having a display section.
Figure 14:
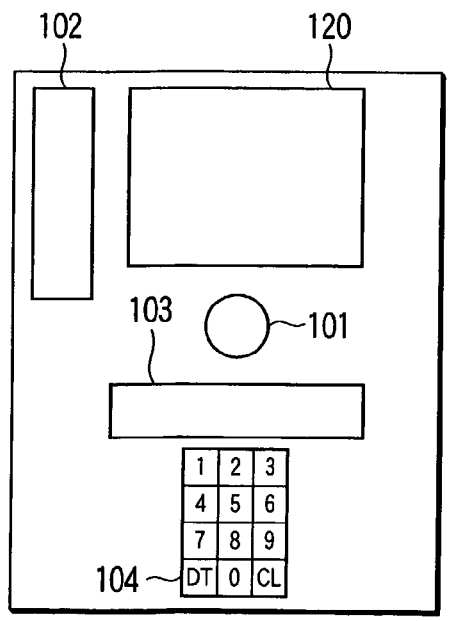
FIG. 14 is a front view showing an example of installation of a unit having a display section.
Figure 15:
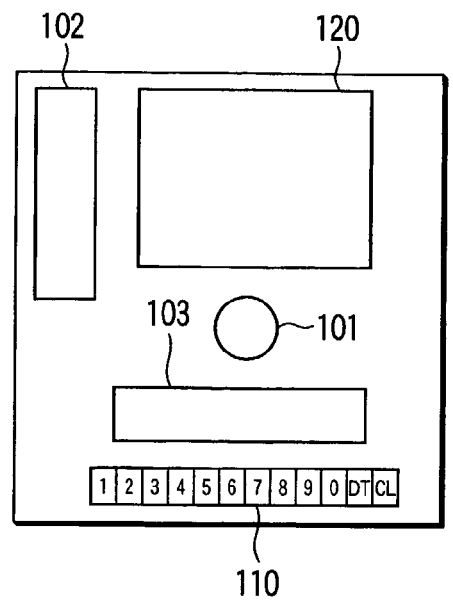
FIG. 15 is a front view showing an example of installation of a unit having a display section.

The arrangement position of the ten-key section 104 is not limited to that shown in FIG. 8. For example, as shown in FIG. 9, the ten-key section 104 can be disposed directly below the camera 101, that is, between the camera 101 and the second illuminating section 103. Further, as shown in FIG. 10, the ten-key section 104 can be disposed below the second illuminating section 103, or as shown in FIG. 11, keys of the ten-key section 104 can be arranged on a horizontal line below the second illuminating section 103. In the above cases, it is possible to attain the effect that a hand of the person who inputs the ID number will not obstruct inputting of a face image as described above.

FIGS. 12, 13, 14 and 15 each show the relation of the arrangement positions in a case where a display section 120 such as a monitor is added to each of the configurations shown in FIGS. 8, 9, 10 and 11. As shown in FIGS. 12 to 15, the face image of a person who is being photographed by the camera 101 can be displayed by arranging the display section 120 such as the monitor. Further, desired information can be displayed on the display section 120 while the recognition process is not being performed.

Next, the relation between an input method by use of the ten-key section 104, a processing method in the number input processing section 111 and the recognition method of the face image is explained in detail. In the following explanation, a case wherein the recognition section 108 recognizes the face image by use of the ID number of a to-be-recognized person 100 is explained.

For example, when the face image of a person is not input, the ID number input by use of the ten-key section 104 is made invalid in the number input processing section 111. Thus, when the face image of a person is not input, the recognition section 108 is kept inoperative. Therefore, a doubtful person or a person who works mischief can be prevented from being incorrectly recognized and the effect that doubtful and mischievous actions can be suppressed can be attained.

Figure 16:
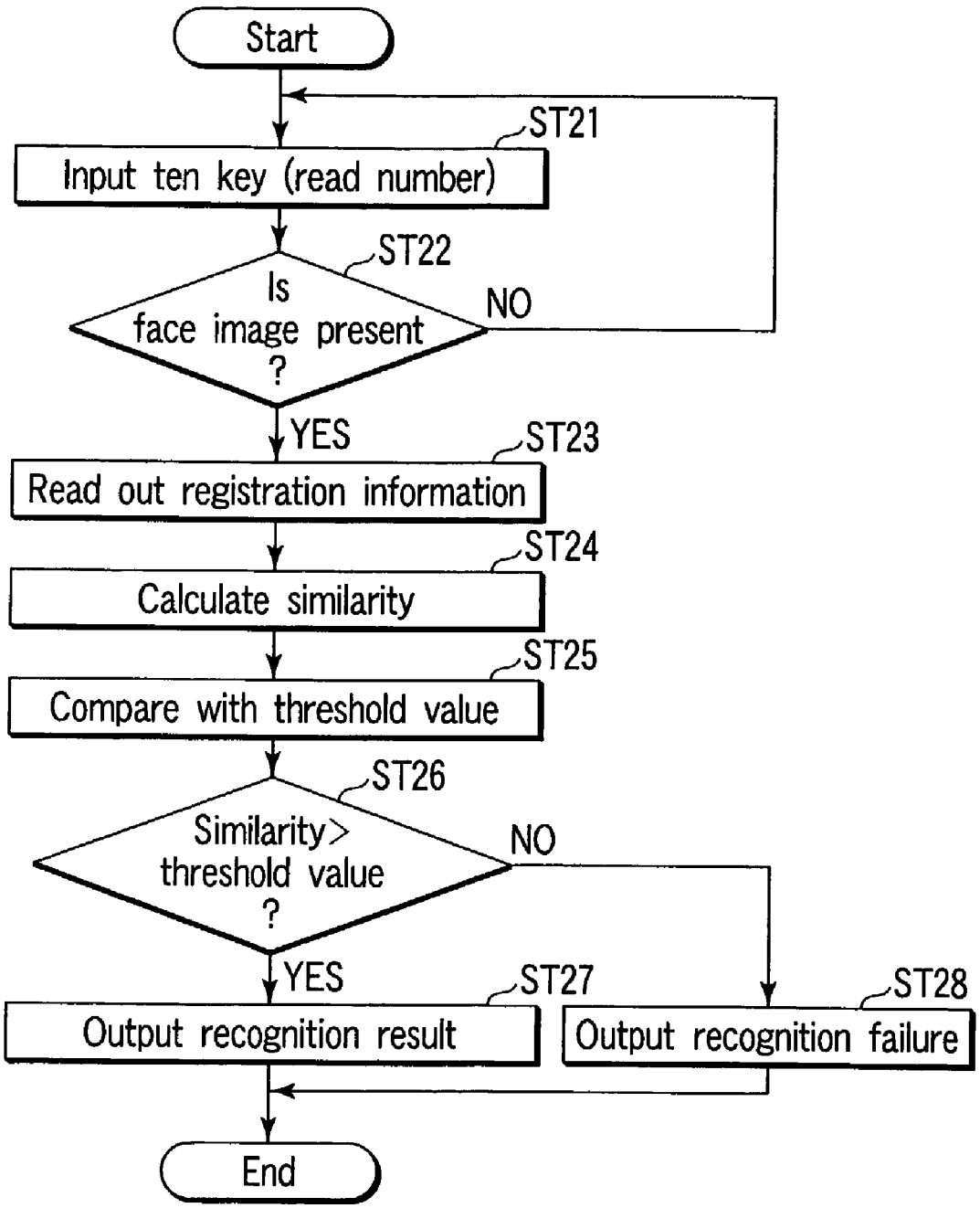
FIG. 16 is a flowchart for illustrating the recognition process of a recognition section according to the first embodiment.

Next, the concrete process is explained with reference to the flowchart shown in FIG. 16. The flowchart shown in FIG. 16 mainly indicates the flow of the recognition process in the recognition section 108.

When an ID number is input by use of the ten-key section 104 (step ST21), the number input processing section 111 detects that the ID number is input. At this time, the recognition section 108 determines whether or not a face image exits in the input image from the camera 101 by performing the face image detecting process by the feature amount extracting section 107 or image input section 106 (step ST22). If it is determined in the above determination process that no face image exists, the recognition section 108 returns the process to the step ST21 and repeats the above operation. That is, even if the ID number is input from the ten-key section 104 and when no input image from the camera 101 exists, the recognition section 108 determines that the operation is a mischievous operation or erroneous operation and makes the ID number input via the ten-key section 104 invalid by use of the number input processing section 111.

Further, it is determined in the step ST22 that the face image exists, the number input processing section 111 deals with the number input via the ten-key section 104 as a valid ID number. Then, the recognition section 108 reads out registration information (partial space) corresponding to the ID number input via the ten-key section 104 and supplied from the number input processing section 111 from the registration information holding section 109 (step ST23). When registration information corresponding to the ID number is read out, the recognition section 108 calculates the similarity between the partial space of each registration information item and an input vector (inherent vector of the partial space calculated based on the input image in the feature amount extracting section 107) or an input partial space in order to perform the recognition process by the partial space method (step ST24).

Next, the recognition section 108 compares the similarity derived in the step ST24 with a preset threshold value (steps ST25, ST26). As the result of comparison, if it is determined that the similarity is larger than the threshold value, the recognition section 108 determines that the person is successfully recognized and outputs the recognition result (step ST27). If the similarity is not larger than the threshold value, the recognition section 108 determines that the person is not successfully recognized and outputs a recognition failure (step ST28).

Further, if the ID number is started to be input by use of the ten-key section 104 and when the face image of a person is detected, the image input section 106 starts to input the face image. As a result, since time for inputting the face image can be reduced and time until the recognition result is output can be reduced, the psychological time-reducing effect on the user can be attained.

Figure 17:
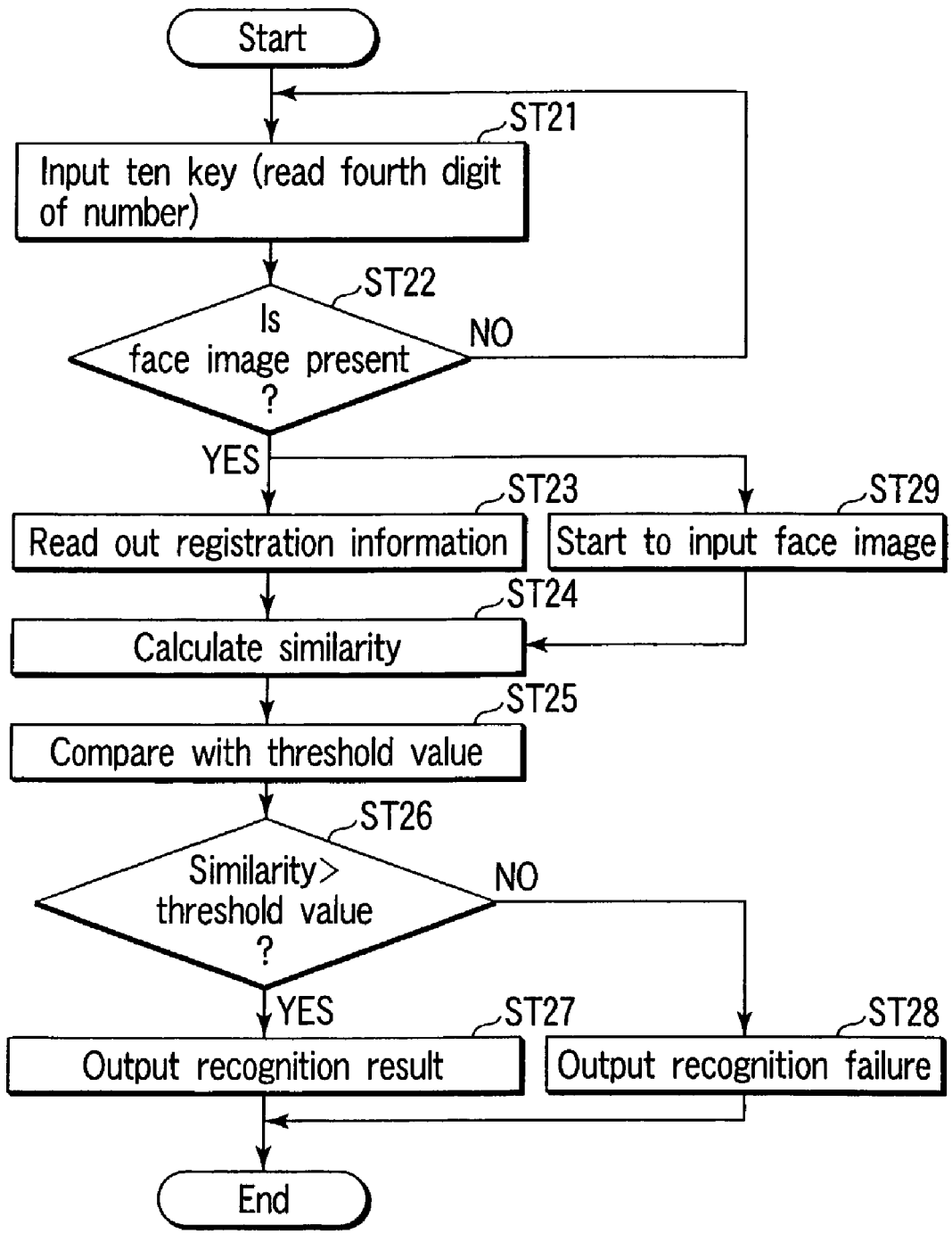
FIG. 17 is a flowchart for illustrating the recognition process of the recognition section according to the first embodiment.

Next, the process for starting to input the image and starting to input the ID number is explained with reference to the flowchart shown in FIG. 17. The flowchart of FIG. 17 is basically the same as the flowchart shown in FIG. 16 except that the step ST29 is additionally provided in which the face image from the camera 101 starts to be input (fetched) when it is determined in the step ST22 that the face image exists in the image photographed by the camera 101, that is, when the face image is detected. The other process are the same as those of FIG. 16 and the detail explanation thereof is omitted.

Further, in the input operation in the ten-key section 104, a method for sequentially reducing the number of registration information items such as ID numbers used as individual information each time the ID number is input by one digit and finally specifying the ID number is considered. For example, if the ID number is configured by four digits, the number of registration information items in the registration information holding section 109 is reduced to approximately 1/10 times the original number when a number of the first upper digit is input. Further, when a number of the second upper digit is input, the number of registration information items is reduced to approximately 1/100 times the original number. Thus, it becomes possible to reduce time until the recognition result is output by sequentially reducing and selecting the number of registration information items.

Figure 18:
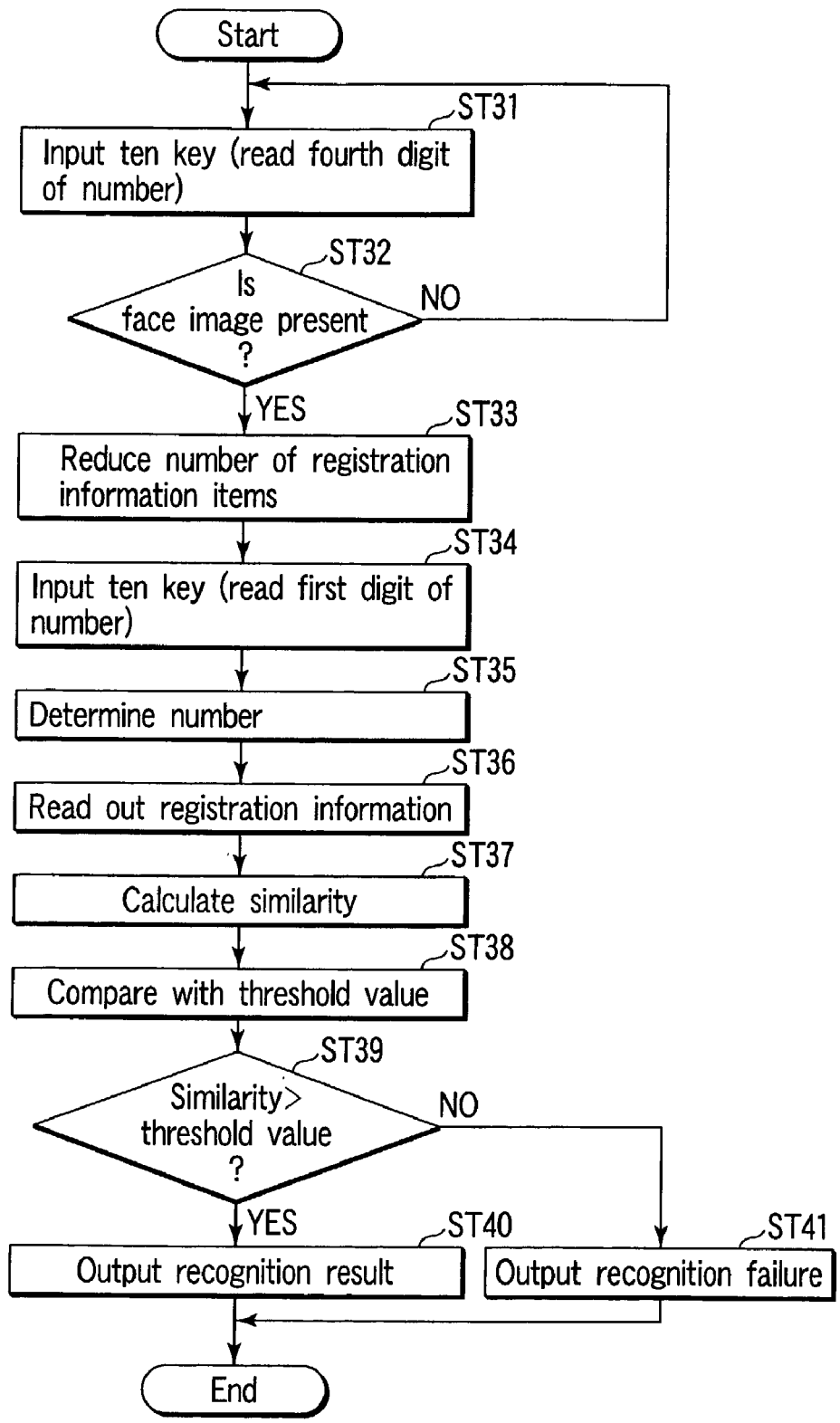
FIG. 18 is a flowchart for illustrating the recognition process of the recognition section according to the first embodiment.

Next, a concrete process for sequentially reducing the number of registration information items each time the ID number is input by one digit is explained with reference to the flowchart shown in FIG. 18. The flowchart of FIG. 18 mainly indicates the flow of the process of the recognition section 108.

When a first digit of the ID number is input by use of the ten-key section 104 (step ST31), the recognition section 108 determines whether or not a face image exits in the image photographed by the camera 101 (step ST32). If it is determined in the above determination process that no face image exists, the recognition section 108 returns the process to the step ST31 and repeats the above operation. Further, if it is determined in the step ST32 that the face image exists, the recognition section 108 reduces the number of registration information items held in the registration information holding section 109 based on the first upper-digit number of the ID number input by use of the ten-key section 104. In this case, registration information items of a corresponding ID number are searched for by using the input first upper-digit number as the searching condition. For example, in a case where numerals of 0 to 9 are uniformly assigned as information of each digit of all of the ID numbers held in the registration information holding section 109, the number of registration information items in the registration information holding section 109 is reduced to approximately 1/10 times the original number. Further, when the second upper digit is input, the recognition section 108 further reduces the number of registration information items which has been reduced to approximately 1/10 times the original number to approximately 1/100 times the original number, for example. The recognition section 108 repeatedly performs the above registration information number reducing process until the fourth upper digit (the lowest digit) of the ID number is input (step ST33).

In this case, if the fourth upper digit (the lowest digit) of the ID number is input (step ST34), the recognition section 108 determines the ID number of four digits (all digits) (step ST35). The recognition section 108 selects and reads out registration information (partial space) corresponding to the thus determined ID number from the reduced number of registration information items in the registration information holding section 109 (step ST36). If the registration information is determined by determination of the ID number, the recognition section 108 calculates the similarity between the partial space of each registration information and an input vector (inherent vector calculated based on the input image in the feature amount extracting section 107) or an input partial space in order to perform the recognition process by the partial space method r the like (step ST37).

Next, the recognition section 108 compares the similarity derived in the step ST37 with a preset threshold value (steps ST38, ST39). As the result of comparison, if it is determined that the similarity is larger than the threshold value, the recognition section 108 determines that the person is successfully recognized and outputs the recognition result (step ST40). If it is determined as the result of comparison that the similarity is not larger than the threshold value, the recognition section 108 determines that the person is not successfully recognized and outputs a recognition failure (step ST41).

As explained above, according to the first embodiment, the effect that a hand of the person who inputs the password or ID number does not obstruct inputting of a face image can be attained by arranging the ten-key section on the lower right side of or directly below the camera as viewed from the to-be-recognized person. Further, the effect that a to-be-recognized person can be kept from becoming aware of the presence of the camera can be attained by arranging the camera inside the ten-key section.

Next, a second embodiment of this invention is explained.

Figure 19:
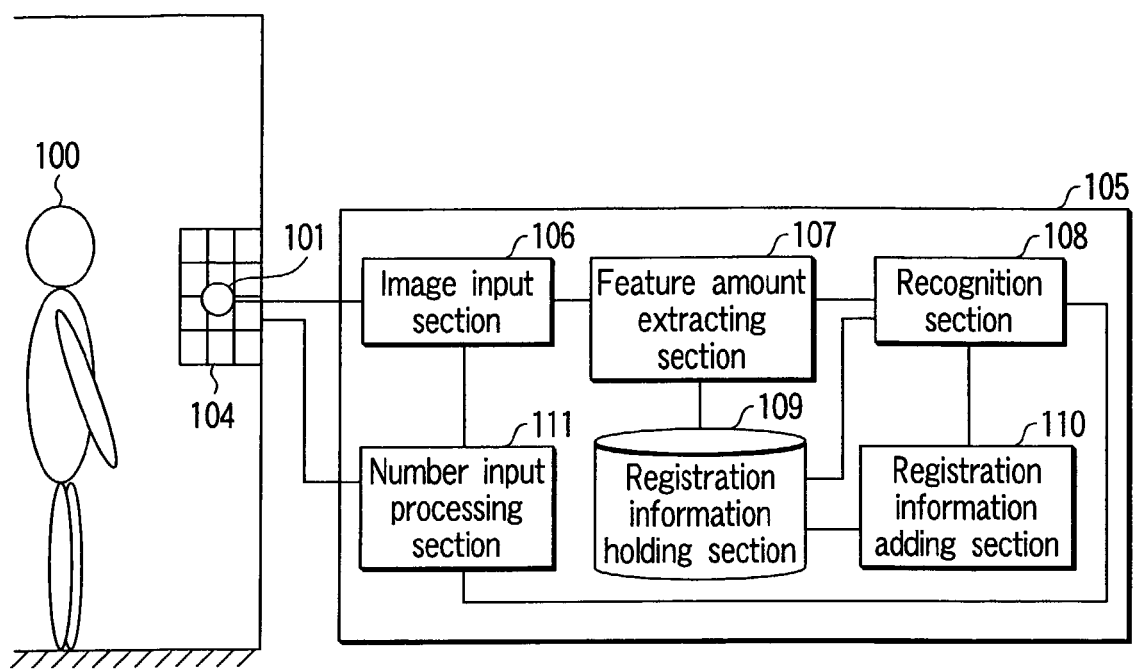
FIG. 19 is a configuration diagram schematically showing the configuration of a face image recognition apparatus according to a second embodiment of this invention.
Figure 20:
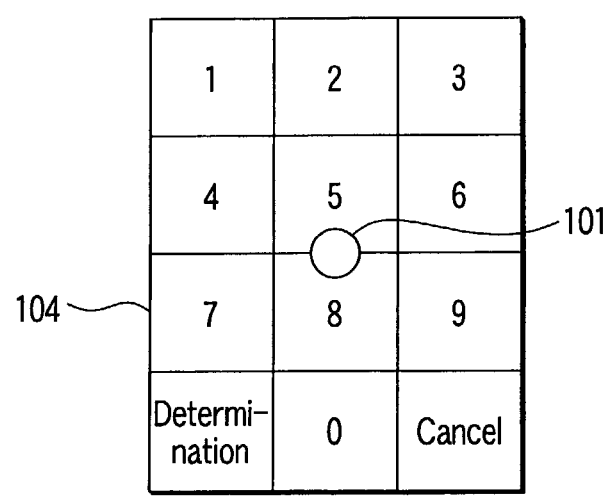
FIG. 20 is a plan view showing the installation state of a camera with respect to a ten-key section.

FIG. 19 schematically shows the configuration of a face image recognition apparatus according to the second embodiment. The second embodiment is similar to the first embodiment except that the first illuminating section 102 and second illuminating section 103 in the first embodiment are omitted and the camera 101 is arranged inside the ten-key section 104, for example, in the central portion of the ten-key section 104 in which keys are arranged in a rectangular form as shown in FIG. 20 in detail. The other portions are the same as those of the first embodiment and the explanation thereof is omitted.

The reason why the first illuminating section 102 and second illuminating section 103 are omitted is that the present apparatus is installed in a location in which external illumination is stable. That is, if the external illumination is stable, a variation in the face image photographed by the camera 101 is small. Therefore, an influence given to a process for extracting a face image from an image photographed by the camera 101, a process for extracting the face feature amount and the like can be suppressed. Particularly, if the external illumination is stable, the way of forming the shade on the face image is stable so that the face feature amount extracted from the image photographed by the camera 101 can be made stable. Therefore, if the external illumination is stable, an influence given to the recognition process can be suppressed even when the illuminating section is not provided and the apparatus can be made small. Of course, even if the first illuminating section 102 and second illuminating section 103 are installed when the external illumination is stable, there occurs no influence on the performance of the recognition process and the like.

Further, as shown in FIG. 20, when the camera 101 is arranged inside the ten-key section 104, the effect that a to-be-recognized person can be kept from becoming aware of the presence of the camera can be attained and the apparatus can be made small.

As described above, according to the second embodiment, it is possible to provide a face image recognition apparatus and passage control apparatus in which the face image of a to-be-recognized person can be acquired in a natural state without causing the to-be-recognized person to become aware of the presence of the image input section by arranging the image input section inside the key-input section.

Next, a third embodiment of this invention is explained.

In the third embodiment, the recognition process is performed for registration information items of a number which is reduced each time the ID number is input by one digit. In the first embodiment, the operation for reducing the number of registration information items each time the ID number is input by one digit is explained, but in the third embodiment, each time the ID number is input by one digit, the number of registration information items is reduced and the recognition process for the reduced number of registration information items is performed.

The configuration of the face image recognition apparatus to which the third embodiment is applied is the same as that of the face image recognition apparatus explained in the first or second embodiment, and therefore, the detail explanation thereof is omitted.

The first example of the operation in the third embodiment is explained below.

Figure 21:
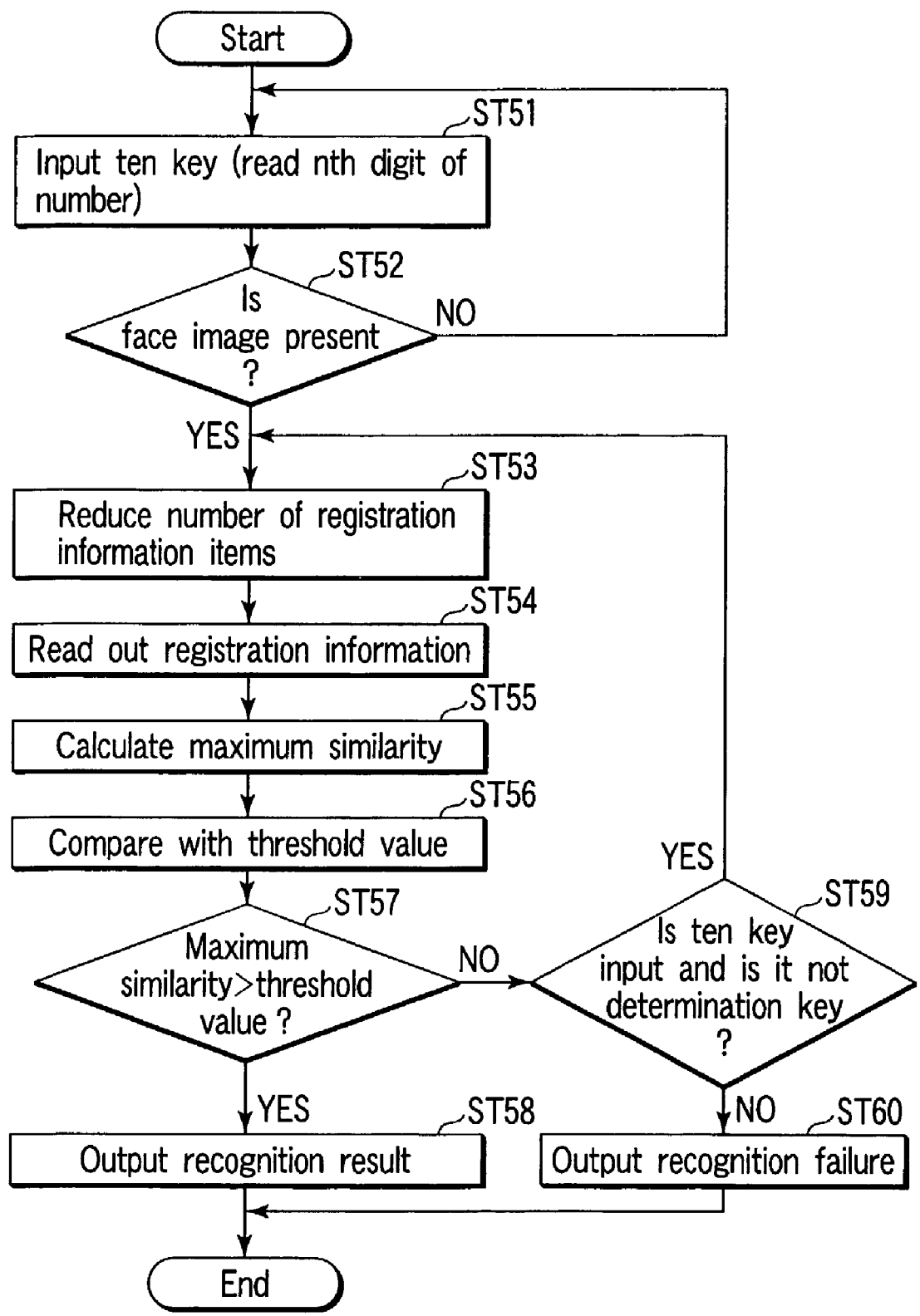
FIG. 21 is a flowchart for illustrating the recognition process of a recognition section according to a third embodiment.

FIG. 21 is a flowchart for illustrating the first operation example of the third embodiment. The flowchart of FIG. 21 mainly shows the flow of the process of a recognition section 108. In the following explanation, a case wherein the ID number is configured by a three-digit number is explained.

When a first digit (first upper digit) of the ID number is input by use of the ten-key section 104 (step ST51), the recognition section 108 determines whether or not a face image exits in an image photographed by the camera 101 (step ST52). If it is determined in the above determination process that no face image exists, the recognition section 108 returns the process to the step ST51 and repeats the above operation. That is, even when the ID number is input by use of the ten-key section 104, the recognition section 108 regards the input operation as a mischievous operation or erroneous operation if no face image exits in the image photographed by the camera 101. Then, the ID number input by use of the ten-key section 104 is made invalid by the number input processing section 111.

Further, it is determined in the step ST52 that the face image exists, the number input processing section 111 makes valid the ID number input by use of the ten-key section 104 and supplies the same to the recognition section 108. When the first digit of the ID number is input by use of the ten-key section 104, that is, when the first digit number from the upper position of the ID number is input, the recognition section 108 reduces the number of registration information items if the number input processing section 111 determines that the input ID number is valid. More specifically, the recognition section 108 selects registration information items of all of the ID numbers each having the same number as the input digit number from all of the registration information items held in the registration information holding section 109 and thus reduces the number of registration information items (step ST53).

After the number of registration information items is reduced according to the first upper digit of the ID number, the recognition section 108 reads out the registration information items of the reduced number from the registration information holding section 109 (step ST54). After reading out the registration information items of the reduced number, the recognition section 108 calculates the similarity between the partial space of each registration information and an input vector (inherent vector of the partial space calculated based on the input image in the feature amount extracting section 107) or an input partial space in order to perform the recognition process by the partial space method or the like based on the readout registration information items. After all of the similarities with respect to the registration information items of the reduced number have been calculated, the recognition section 108 derives the maximum one of the calculated similarities (maximum similarity) (step ST55).

Next, the recognition section 108 compares the maximum similarity derived in the step ST55 with a preset threshold value (steps ST56, ST57). As the result of comparison, if it is determined that the maximum similarity is larger than the threshold value, the recognition section 108 determines that collation between the face image photographed by the camera 101 and the registration information of the maximum similarity is successfully made and outputs the recognition result based on the registration information (step ST58).

If the maximum similarity is not larger than the threshold value, the recognition section 108 waits until a next digit of the ID number is input by use of the ten-key section 104. In this state, if input of a determination key which is used to determine the ID number is not made and a next-digit number (the second digit number from the upper position of the ID number) is input by use of the ten-key section 104 (step ST59), the recognition section 108 further reduces the number of registration information items from the registration information items of the number which has been reduced in the preceding cycle (the registration information items of the number which has been reduced based on the first upper-digit number) based on the input second upper-digit number (step ST53).

When the number of registration information items is reduced according to the second digit of the ID number, the recognition section 108 reads out the registration information items of the reduced number from the registration information holding section 109 (step ST54). Then, the recognition section 108 calculates the similarity between the partial space of each registration information and an input vector (inherent vector of the partial space calculated based on the input image in the feature amount extracting section 107) or an input partial space in order to perform the recognition process by the partial space method or the like. At this time, since the number of registration information items is further reduced in comparison with a case in the preceding cycle, it is possible for the recognition section 108 to calculate the similarity between the registration information and the input vector or input partial space by use of a different recognition method. Further, the recognition section 108 may permit the feature amount extracting section 107 to perform the extraction process for extracting the inherent vector or input partial space from the input image again.

After all of the similarities with respect to the registration information items of the number which is reduced according to the second upper digit of the ID number have been calculated, the recognition section 108 derives the maximum one of the calculated similarities (maximum similarity) (step ST55). When the maximum similarity is derived, the recognition section 108 compares the maximum similarity derived in the step ST55 with a preset threshold value (steps ST56, ST57). In this case, since the number of registration information items is further reduced in comparison with a case in the preceding cycle, the threshold value to be compared with the maximum similarity may be set to a value smaller than the threshold value used in the preceding cycle.

As the result of comparison, if it is determined that the maximum similarity is larger than the threshold value, the recognition section 108 determines that collation between the input face image and the registration information of the maximum similarity is successfully made and outputs the recognition result based on the registration information (step ST58).

Further, as the result of comparison, if it is determined that the maximum similarity is not larger than the threshold value, the recognition section 108 waits until a next number is input by use of the ten-key section 104. In this state, if input of the determination key which is used to specify completion of input of the ID number is not made and a next-digit number (the third digit number from the upper position of the ID number) is input by use of the ten-key section 104 (step ST59), the recognition section 108 further reduces the number of registration information items from the registration information items of the number which has been reduced in the second cycle (the registration information items of the number which has been reduced based on the first and second upper-digit numbers) based on the input third upper-digit number (step ST53).

When the number of registration information items is reduced according to the third digit ID number, the recognition section 108 reads out the registration information items of the reduced number from the registration information holding section 109 (step ST54) like the case of the preceding cycle. After reading out the reduced number of registration information items, the recognition section 108 calculates the similarity between the partial space of each registration information and an input vector (inherent vector from the feature amount extracting section 107) or an input partial space. At this time, since the number of registration information items is further reduced in comparison with a case in the preceding cycle, it is possible for the recognition section 108 to calculate the similarity between the registration information and the input vector or input partial space by use of a recognition method different from that used in the preceding cycle. Further, the recognition section 108 may permit the feature amount extracting section 107 to perform the extraction process for extracting the inherent vector or input partial space from the input image again.

After all of the similarities with respect to the registration information items of the number which is reduced according to the third upper digit of the ID number have been calculated, the recognition section 108 derives the maximum one of the calculated similarities (maximum similarity) (step ST55). The recognition section 108 compares the maximum similarity derived in the step ST55 with a preset threshold value (steps ST56, ST57). In this case, since the number of registration information items is further reduced in comparison with a case in the preceding cycle, the threshold value to be compared with the maximum similarity may be set to a value smaller than the threshold value used in the preceding cycle.

As the result of comparison, if it is determined that the maximum similarity is larger than the threshold value, the recognition section 108 determines that collation between the input face image and the registration information of the maximum similarity is successfully made and outputs the recognition result based on the registration information (step ST58).

Further, as the result of comparison, if it is determined that the maximum similarity is not larger than the threshold value, the recognition section 108 waits until a next number is input by use of the ten-key section 104. In this state, if the determination key used to specify completion of input of the ID number is input, the recognition section 108 determines that recognition results in failure and outputs a recognition failure. Further, when a cancel key which is operated to cancel the number input by use of the ten-key section 104 is input, the recognition section 108 returns the process to the step ST51 and repeats the process of the steps ST51 to ST59.

In the above description, a case wherein the ID number is configured by three digits is explained, but the same effect as described above can be attained by performing the process of the steps ST51 to ST59 until all of the numbers of the ID number are determined even when the ID number is configured by any number of digits other than three digits.

Further, when a recognition failure is made, recognition data obtained from the face image at this time can be held in the registration information holding section 109 as new recognition data (registration information) as explained with reference to the registration information adding section 110. The detail process is the same as explained above and therefore the explanation thereof is omitted.

As described above, according to the first operation example of the third embodiment, the number of registration information items is reduced based on the input number and the recognition process is performed each time one of the numbers of the ID number is input. If the recognition process is successfully performed in the course of inputting the ID number, the recognition result is output at this time point. As a result, time until the recognition result is output for the registrant can be reduced and the psychological time-reducing effect on the user can be attained.

Figure 22:
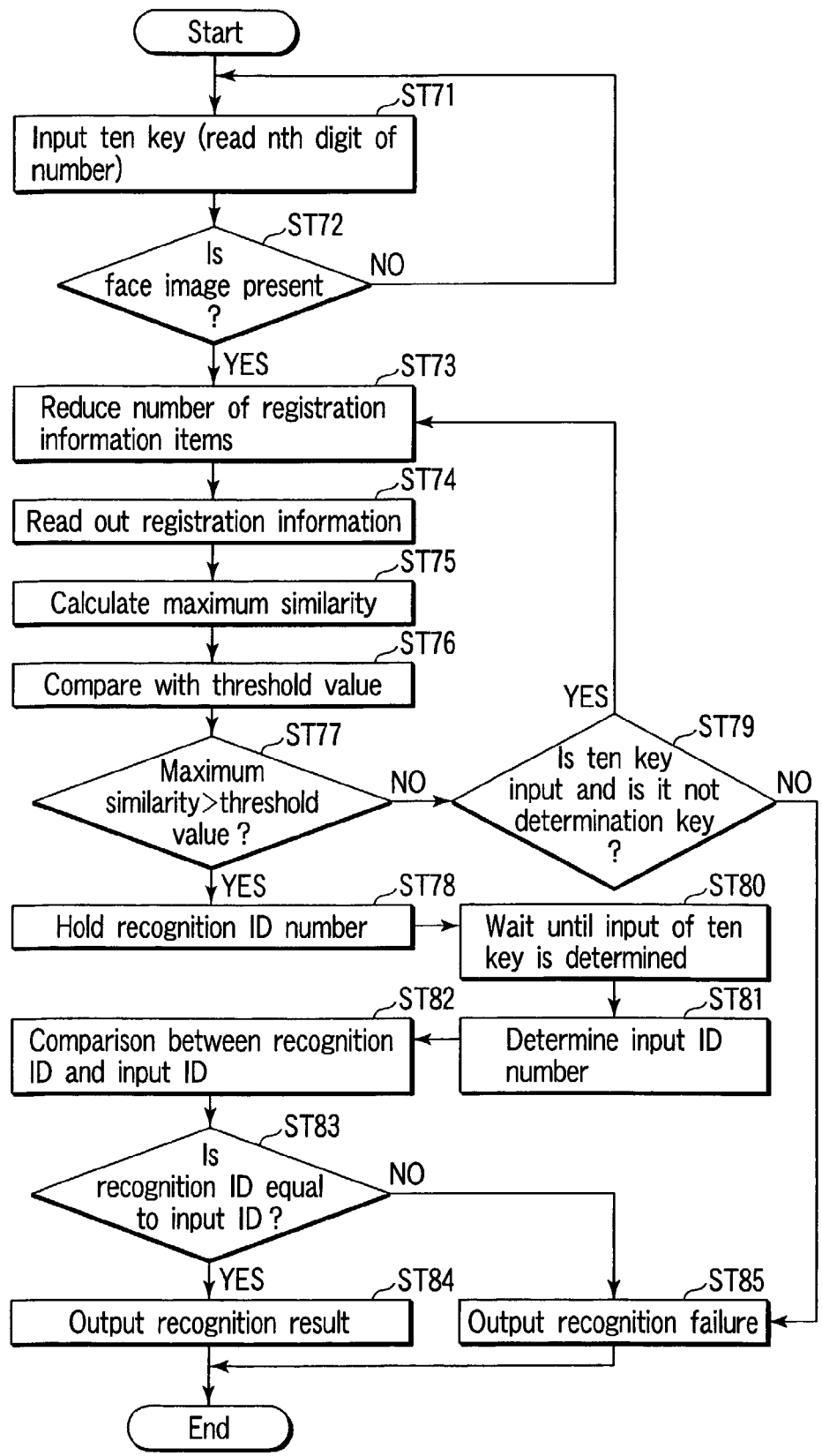
FIG. 22 is a flowchart for illustrating the recognition process of the recognition section according to the third embodiment.

Next, a second example of the operation according to the third embodiment is explained. FIG. 22 is a flowchart for illustrating the second operation example according to the third embodiment. The flowchart of FIG. 22 mainly shows the flow of a process in the recognition section 108.

The steps ST71 to ST77, ST79 shown in FIG. 22 are the same as the steps ST51 to ST57, ST59. Therefore, the detail explanation for the steps ST71 to ST77, ST79 is omitted.

That is, if it is determined in the step ST77 that the maximum similarity is larger than a threshold value, the recognition section 108 determines that collation between the input face image and the registration information of the maximum similarity is successfully made. Based on the determination result, the recognition section 108 determines an ID number based on the registration information which is successfully collated with the input face image. Then, the recognition section 108 stores the ID number (recognition ID number) determined based on the registration information which is successfully collated with the input face image into a memory (not shown) or the like.

After the ID number determined based on the registration information which is successfully collated is held in the memory, the recognition section 108 waits until the to-be-recognized person inputs the determination key used to specify completion of input of the ID number (step ST80). In this state, if the determination key is input, the recognition section 108 determines or decides the ID number (input ID number) input by the user (step ST81). If the ID number is thus determined by the user, the recognition section 108 compares the recognition ID number held in the memory with the input ID number input by the user (step ST83).

As the result of comparison, if it is determined that the ID number (recognition ID number) obtained from the recognition result coincides with the ID number (input ID number) input by the to-be-recognized person, the recognition section 108 determines that recognition of the face image based on the ID number is successfully made and outputs the recognition result. Further, if it is determined that the recognition ID number does not coincide with the input ID number, the recognition section 108 determines that recognition of the face image based on the ID number results in failure and outputs a recognition failure.

When a recognition failure is made, recognition information containing a feature amount obtained from the face image at this time can be held in the registration information holding section 109 as new recognition information as explained with reference to the registration information adding section 110. The registration process of the new recognition information is the same as explained above and therefore the explanation thereof is omitted.

As described above, according to the second operation example of the third embodiment, the number of registration information items is reduced and the recognition process is performed each time one of the numbers of the ID number is input. If the recognition process is successfully performed in the course of inputting the ID number, the ID number obtained based on the recognition information (recognition information which gives the maximum similarity) which is used to successfully make the recognition process is held. Then, after completion of input of an ID number by the user, the input ID number is compared with the ID number obtained based on the recognition information which is used to successfully make the recognition process. If the compared ID numbers coincide with each other, the recognition result is output, and if the compared ID numbers do not coincide with each other, a recognition failure is output. As a result, the security performance in the recognition process can be enhanced.

As described above, according to the third embodiment, the number of registration information items is reduced and the recognition process is performed each time the to-be-recognized person inputs one digit of the ID number. Thus, when the recognition process is performed based on the ID number input by the to-be-recognized person, a required period from the time input of the ID number is started until the time the recognition result is obtained can be substantially reduced.

Further, if collation with specified registration information is successfully made before the to-be-recognized person inputs all of the digits of the ID number, the specified registration information with which collation is successfully made is stored. Then, when input of the ID number by the to-be-recognized person is completed, whether or not the ID number input by the to-be-recognized person coincides with the ID number of the registration information obtained as the recognition result is determined. As a result, whether recognition is successfully made or results in failure can be determined simply by determining whether or not the ID numbers coincide with each other when input of the ID number is completed. Thus, a required period from the time input of the ID number is completed until the time the final determination result is obtained can be reduced.

Next, a fourth embodiment of this invention is explained.

The fourth embodiment is an example showing a case wherein the face image recognition apparatus explained in the first embodiment is applied to a passage control apparatus which recognizes a face image of a passer and controls the passage of the passer. In this case, as the example of the fourth embodiment, a case wherein the face image recognition apparatus explained in the first embodiment is applied to the passage control apparatus is explained, but it is also possible to apply the face image recognition apparatus explained in the second or third embodiment to a passage control apparatus.

Figures 23, 24, 25, 26, 27:
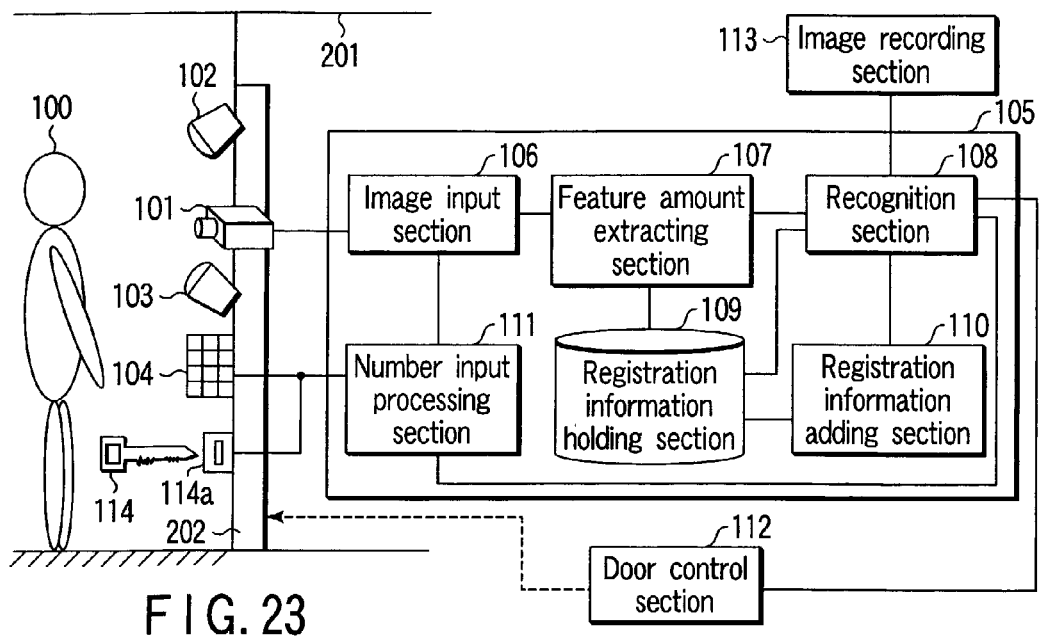
FIG. 23 is a configuration diagram schematically showing the configuration of a passage control apparatus according to a fourth embodiment of this invention.
FIG. 24 is a configuration view showing an example of the configuration of a ten-key section.
FIG. 25 is a configuration view showing an example of the configuration of a ten-key section.
FIG. 26 is a configuration view showing an example of the configuration of a ten-key section.
FIG. 27 is a configuration view showing an example of the configuration of a ten-key section.

FIG. 23 schematically shows the passage control apparatus according to the fourth embodiment. For example, the passage control apparatus performs entrance/exit management with respect to an important facility (such as a room in which much stress is put on the security), recognizes the face image of a visitor (passer) and controls the open/close state of the entrance/exit door of the important facility based on the recognition result.

The passage control apparatus includes a camera 101, first illuminating section 102, second illuminating section 103, ten-key section 104, processing section 105, door control section 112 as passage control means and image recording section 113 as image recording means. The door control section 112 controls the open/close state of an entrance/exit door 202 of an important facility (visiting destination) 201 based on the recognition result in a recognition section 108. The image recording section 113 is a memory which records a face image photographed by the camera 101. In FIG. 23, since portions other than the door control section 112 and image recording section 113 are the same as those of the face image recognition apparatus of FIG. 1, the same reference symbols are attached thereto and the explanation thereof is omitted.

As shown in FIGS. 24, 25, for example, the ten-key section 104 includes numeral keys "0" to "9", determination key and cancel key. Further, as shown in FIGS. 26, 27, a call button 104a can be additionally provided on the ten-key section 104. The call button 104a is used to call a person who lives in the visiting destination 201 when the recognition result of the recognition section 108 indicates that the derived similarity is smaller than the threshold value in the step ST6 in FIG. 7, for example. FIGS. 24 and 26 show the ten-key section 104 in which the keys are arranged in a rectangular form, and FIGS. 25 and 27 show the ten-key section 104 in which the keys are linearly arranged (in a linear form).

For example, the recognition section 108 outputs a signal of "open the door" to the door control section 112 when it is determined in the step ST6 in FIG. 7 that the derived similarity is larger than the threshold value or it is determined in the step ST11 that the derived similarity is larger than the threshold value. On the other hand, the recognition section 108 outputs a signal of "close the door" to the door control section 112 when the derived similarity is smaller than the threshold value.

When receiving the signal of "open the door" from the recognition section 108, the door control section 112 controls and sets the entrance/exit door 202 into an open state so as to permit a to-be-recognized person (in this case, a visitor) 100 to pass through the door. Further, when receiving the signal of "close the door", the door control section 112 holds the entrance/exit door 202 in a closed state so as to give no admittance to the visitor 100.

If the recognition section 108 fails to recognize the input face image, the image recording section 113 records the input face image. For example, a video recorder, hard disk device or the like is used as the image recording section 113. Thus, by recording the input face image, information of the visitor can be arranged and the face image of a doubtful person can be checked.

Next, a case wherein the present apparatus is installed at the entrance of an apartment house (such as a mansion) or the like is explained. In this case, by inputting the room number as identification information of the visiting destination by use of the ten-key section 104, the number of registration information items can be reduced. If recognition by the recognition section 108 is successfully made, the entrance/exit door 202 is unlocked, and if the recognition results in failure, the person in the object visiting destination 201 is called by use of the call button 104a.

Figure 28:
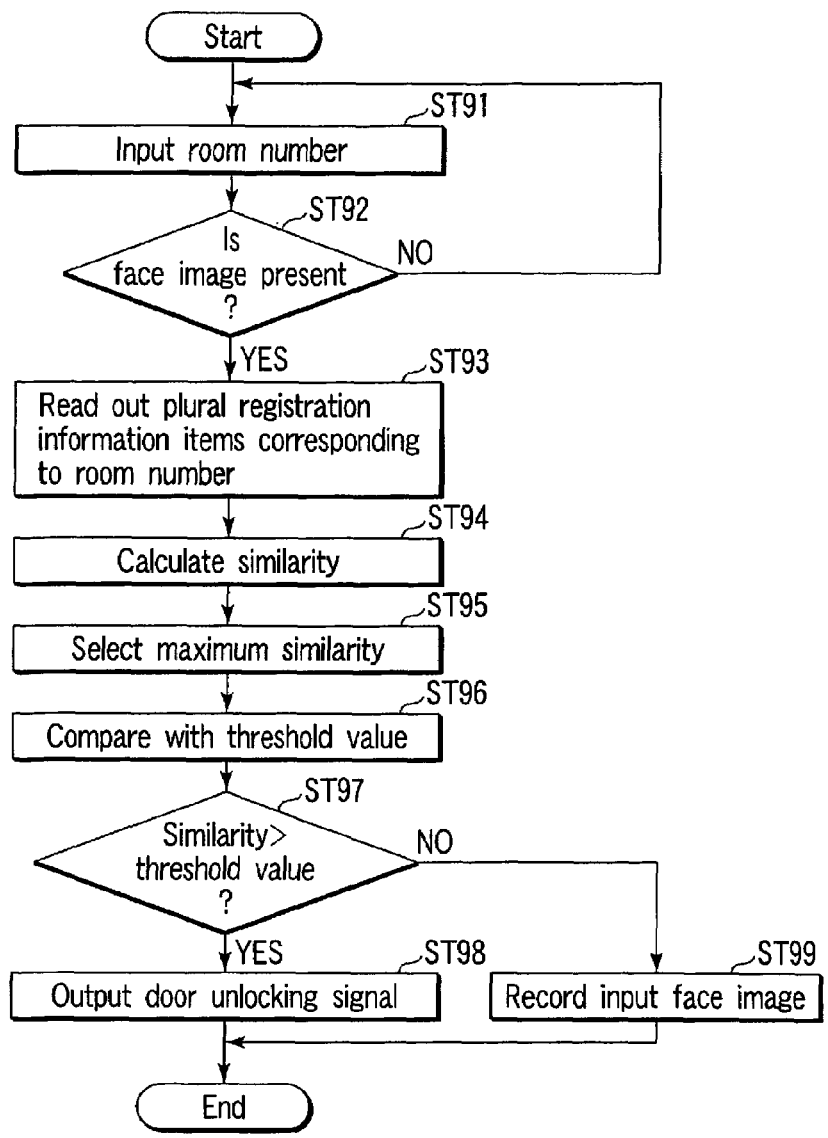
FIG. 28 is a flowchart for illustrating the recognition process of a recognition section according to the fourth embodiment.

Next, the concrete process performed when the present apparatus is installed at the entrance of the apartment house (such as a mansion) or the like is explained with reference to the flowchart shown in FIG. 28. The flowchart shown in FIG. 28 mainly shows the flow of a process of the recognition section 108. In this example, it is assumed that a plurality of registration information items (of all of the members of the family, for example) are held in correspondence to one room number in a registration information holding section 109.

First, when a room number is input by use of the ten-key section 104 (step ST91), the face image input section 106 or feature amount extracting section 107 determines whether or not a face image exists in the image photographed by the camera 101 (step ST92). If an input image (face image) does not exist, the process is returned to the step ST91 and the above operation is repeated. If it is determined in the step ST92 that the face image exists, the number input processing section 111 makes valid the number input by use of the ten-key section 104 and supplies the same to the recognition section 108. The recognition section 108 reads out a plurality of registration information items (partial spaces) registered in correspondence to the number (room number) input via the ten-key section 104 from the registration information holding section 109 (step ST93).

When the plurality of registration information items corresponding to the input room number are read out, the recognition section 108 calculates the similarities between the plurality of registration information items read out from the registration information holding section 109 and the feature amount (partial space) extracted by the feature amount extracting section 107 from the image photographed by the camera 101 (step ST94). When the similarities with respect to the plurality of registration information items are calculated, the recognition section 108 selects the maximum one of the calculated similarities (step ST95). After determining the maximum similarity, the recognition section 108 compares the maximum similarity with a preset threshold value (steps ST96, ST97).

As the result of comparison, if the maximum similarity is larger than the preset threshold value, the recognition section 108 outputs a signal of "open the door" to the door control section 112 (step ST98). On the other hand, as the result of comparison, if the maximum similarity is not larger than the preset threshold value, the recognition section 108 outputs a signal of "close the door" to the door control section 112 (step ST99).

Inherent information, for example, a telephone number of a person who lives in the visiting destination 201 can be input instead of the room number and the input inherent information of the person can be converted into a room number. Also, in this case, the same effect as that obtained in the above operation example can be attained.

Figure 29:
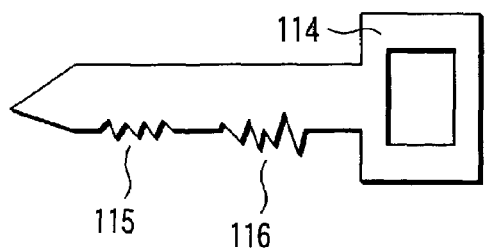
FIG. 29 is a configuration view schematically showing the configuration of a physical key.

Further, the entrance/exit door 202 can be locked or unlocked by use of a physical key 114 at the entrance of the mansion, for example. In this case, as shown in FIG. 23, it is assumed that a key receiving section 114a which receives the physical key 114 is provided on the entrance/exit door 202 of the present apparatus and connected to the number input processing section 111. As shown in FIG. 29, the physical key 114 has a particular shape inherent to each room.

That is, as shown in FIG. 29, normally, the physical key 114 usable at the entrance of the high-class house or mansion has a groove portion 115 which is common for the respective rooms and a groove portion (identifying portion inherent to the visiting destination) 116 inherent to each room. When the physical key 114 is inserted into the key receiving section 114a, the key receiving section 114a identifies the groove portion 116 inherent to each room. Thus, the key receiving section 114a or number input processing section 111 recognizes the room number corresponding to the physical key 114. Therefore, the above physical key 114 can be used instead of input of the room number.

The concrete process performed when the physical key 114 is used is explained with reference to the flowchart shown in FIG. 30. The flowchart of FIG. 30 is basically the same as the flowchart of FIG. 28 except the process of the step ST101 and the other process of the steps ST102 to ST109 of FIG. 30 is the same as that of the steps ST92 to ST99 of FIG. 28. In the step ST101 of FIG. 30, when the physical key 114 is inserted into the key receiving section 114a, the key receiving section 114a or number input processing section 111 recognizes the room number corresponding to the physical key 114 according to the shape of the groove portion 116 of the physical key 114. Based on the recognition result, the key receiving section 114a or number input processing section 111 supplies the room number corresponding to the physical key 114 to the recognition section 108. The process performed after this is the same as that of FIG. 28 and therefore the explanation thereof is omitted.

Further, a card reader which copes with a card (recording medium) such as a radio card, IC card, magnetic card or the like can be used instead of the ten-key section 104 and information such as a room number recorded on the recording medium can be input. Also, in this case, the same effect attained in the above operation example can be realized.

As described above, according to the fourth embodiment, the passage of a passer (entrance/exit of a visitor) can be controlled by use of the face image recognition apparatus explained in the first, second or third embodiment.

Further, according to the fourth embodiment, information of the visitor can be neatly arranged and the face image of a doubtful person can be checked by recording the input face image when the input face image cannot be recognized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A face image recognition apparatus which recognizes a person based on a face image, comprising:
   a key input section which permits a to-be-recognized person to input his own identification information,
   an image input section which is disposed inside said key input section and inputs a face image of a to-be-recognized person,
   an illuminating section which applies light toward at least a face of the to-be-recognized person,
   a feature amount extracting section which extracts a feature amount of the face of the to-be-recognized person based on the face image input by said image input section,
   a feature amount registration section in which a reference feature amount is previously registered in correspondence to identification information of the to-be-recognized person, and
   a recognition section which recognizes the face image of the to-be-recognized person by acquiring a reference feature amount corresponding to identification information input by use of said key input section from said feature amount registration section based on the identification information and collating the thus acquired reference feature amount with a feature amount extracted by said feature amount extracting section, wherein said illuminating section includes a first illuminating section which is disposed on the upper right side or upper left side of said image input section as viewed from the to-be-recognized person and applies light toward at least the face of the to-be-recognized person and a second illuminating section which is disposed below said image input section as viewed from the to-be-recognized person and applies light toward at least the face of the to-be-recognized person, and an illuminance of light from the first illuminating section and an illuminance of light from the second illuminating section are different,
   wherein the illuminance of light from the first illuminating section is greater than the illuminance of light from the second illuminating section.

2. A face image recognition apparatus which recognizes a person based on a face image, comprising:
   a key input section which permits a to-be-recognized person to input his own identification information,
   an image input section which is disposed inside said key input section and inputs a face image of a to-be-recognized person,
   an illuminating section which applies light toward at least a face of the to-be-recognized person,
   a feature amount extracting section which extracts a feature amount of the face of the to-be-recognized person based on the face image input by said image input section,
   a feature amount registration section in which a reference feature amount is previously registered in correspondence to identification information of the to-be-recognized person,
   a recognition section which recognizes the face image of the to-be-recognized person by acquiring a reference feature amount corresponding to identification information input by use of said key input section from said feature amount registration section based on the identification information and collating the thus acquired reference feature amount with a feature amount extracted by said feature amount extracting section, and
   a control section which makes the information input by use of said key input section invalid when no feature amount of the face is extracted by said feature amount extracting section,
   wherein the identification information of the to-be-recognized person is configured by characters of n (plural) digits, and said recognition section repeatedly performs a method for reducing the number of registration information items in response to input of the character of the nth digit when the n-digit identification information is input by said key input section and further reducing the number of registration information items in response to input of the character of the (n—1)th digit until the character of the first digit is input and acquires a reference feature amount corresponding to the n-digit identification information.

3. A face image recognition apparatus which recognizes a person based on a face image, comprising:
   an image input section which inputs a face image of a to-be-recognized person,
   a feature amount extracting section which extracts a feature amount of a face of the to-be-recognized person based on the face image input by said image input section,
   a feature amount registration section in which a reference feature amount is previously registered in correspondence to identification information of the to-be-recognized person,
   a key input section which permits the to-be-recognized person to input his own identification information configured by characters of plural digits, and
   a recognition section which recognizes the face image of the to-be-recognized person by collating the face feature amount extracted by said feature amount extracting section with a reference feature amount as registration information of a number reduced and selected from said feature amount registration section based on identification information of at least one digit input by use of said key input section each time the identification information is input by one digit by use of said key input section, wherein said recognition section holds identification information as the recognition result in the case where recognition is successfully made by use of the face image before all of the digits of the identification information are input by said key input section and determines whether or not the identification information held as the recognition result and the identification information input by the to-be-recognized person coincide with each other in the case where the to-be-recognized person inputs all of the digits of the identification information by use of said key input section.

4. The face image recognition apparatus according to claim 3, wherein said recognition section includes a searching section which reduces the number of registration information items registered in said feature amount registration section based on identification information of at least one digit input by use of said key input section each time the identification information is input by one digit by use of said key input section, a calculating section which calculates similarities between the registration information items of the number reduced by said searching section and the face feature amount extracted by said feature amount extracting section and derives a maximum similarity, a first determining section which determines a recognition result based on registration information which gives the maximum similarity in the case where the maximum similarity calculated by said calculating section is larger than a preset threshold value, and a second determining section which determines that recognition by use of the face image results in failure in the case where the to-be-recognized person inputs all of the digits of the identification information while the maximum similarity calculated by said calculating section is kept not larger than the preset threshold value.

5. The face image recognition apparatus according to claim 4, wherein said recognition section further includes a holding section which holds identification information as a recognition result in the case where the maximum similarity calculated by said calculating section is larger than a preset threshold value, a determining section which determines whether or not the identification information held in said holding section and the identification information input by use of said key input section coincide with each other when all of the digits of the identification information are input by use of said key input section while the identification information as the recognition result is held in said holding section, said first determining section determines a recognition result based on registration information which gives the maximum similarity in the case where said determining section determines that the identification information items coincide with each other, and said second determining section determines that recognition by use of the face image results in failure in the case where said determining section determines that the identification information items do not coincide with each other.

6. A passage control apparatus which recognizes a face image of a passer and controls the passage of the passer, comprising:
a key input section which permits the passer to input his own identification information,
an image input section which is disposed inside said key input section and inputs a face image of a passer,
an illuminating section which applies light toward at least a face of the passer,
a feature amount extracting section which extracts a feature amount of the face of the passer based on the face image input by said image input section,
a feature amount registration section in which a reference feature amount is previously stored in correspondence to identification information of the passer,
a recognition section which recognizes the face image of the passer by acquiring a reference feature amount corresponding to identification information input by use of said key input section from said feature amount registration section based on the identification information and collating the thus acquired reference feature amount with the feature amount extracted by said feature amount extracting section, and
a passage control section which controls the passage of the passer based on the recognition result by said recognition section, wherein said illuminating section includes a first illuminating section which is disposed on the upper right side or upper left side of said image input section as viewed from the passer and applies light toward at least the face of the passer and a second illuminating section which is disposed below said image input section and applies light toward at least the face of the passer, and an illuminance of light from the first illuminating section and an illuminance of light from the second illuminating section are different,
wherein the illuminance of light from the first illuminating section is greater than the illuminance of light from the second illuminating action.

7. A passage control apparatus which recognizes a face image of a passer and controls the passage of the passer, comprising:
a key input section which permits the passer to input his own identification information,
an image input section which is disposed inside said key input section and inputs a face image of a passer,
an illuminating section which applies light toward at least a face of the passer,
a feature amount extracting section which extracts a feature amount of the face of the passer based on the face image input by said image input section,
a feature amount registration section in which a reference feature amount is previously stored in correspondence to identification information of the passer,
a recognition section which recognizes the face image of the passer by acquiring a reference feature amount corresponding to identification information input by use of said key input section from said feature amount registration section based on the identification information and collating the thus acquired reference feature amount with the feature amount extracted by said feature amount extracting section,
a passage control section which controls the passage of the passer based on the recognition result by said recognition section, and
a control section which makes the information input by use of said key input section invalid when no feature amount of the face is extracted by said feature amount extracting sections,
wherein identification information of the passer is configured by characters of n (plural) digits, and said recognition section repeatedly performs a method for reducing the number of registration information items in response to input of the character of the nth digit when n-digit identification information is input by said key input section and further reducing the number of registration information items in response to input of the character of the (n−1)th digit until the character of the first digit is input and acquires a reference feature amount corresponding to the n-digit identification information.

8. A passage control apparatus which recognizes a face image of a passer and controls the passage of the passer, comprising:
an image input section which inputs a face image of a passer, a feature amount extracting section which extracts a feature amount of a face of the passer based on the face image input by said image input section, a feature amount registration section in which a reference feature amount corresponding to identification information of each registrant is previously registered as registration information, a key input section which permits the passer to input his own identification information configured by characters of plural digits, and a recognition section which recognizes the face image of the passer by collating the face feature amount extracted by said feature amount extracting section with a reference feature amount as the registration information of a number reduced and selected from said feature amount registration section based on identification information of at least one digit input by use of said key input section each time the identification information is input by one digit by use of said key input section, wherein said recognition section holds identification information as the recognition result when recognition is successfully made by use of the face image before all of the digits of the identification information are input by said key input section and determines whether or not the identification information held as the recognition result and the identification information input by the passer coincide with each other when the passer inputs all of the digits of the identification information by use of said key input section.

9. The passage control apparatus according to claim 8, wherein said recognition section includes a searching section which reduces the number of registration information items registered in said feature amount registration section based on identification information of at least one digit input by use of said key input section each time the identification information is input by one digit by use of said key input section, a calculating section which calculates similarities between the registration information items of the number reduced by said searching section and the face feature amount extracted by said feature amount extracting section and derives a maximum one of the similarities, a first determining section which determines a recognition result based on registration information which gives the maximum similarity in the case where the maximum similarity calculated by said calculating section is larger than a preset threshold value, and a second determining section which determines that recognition by use of the face image results in failure in the case where the passer inputs all of the digits of the identification information while the maximum similarity calculated by said calculating section is kept not larger than the preset threshold value.

10. The passage control apparatus according to claim 9, wherein said recognition section further includes a holding section which holds identification information as a recognition result in the case where the maximum similarity calculated by said calculating section is larger than a preset threshold value, a determining section which determines whether or not the identification information held in said holding section and the identification information input by use of said key input section coincide with each other when all of the digits of the identification information are input by use of said key input section while the identification information as the recognition result is held in said holding section, said first determining section determines a recognition result based on registration information which gives the maximum similarity in the case where said determining section determines that the identification information items coincide with each other, and said second determining section determines that recognition by use of the face image results in failure in the case where said determining section determines that the identification information items do not coincide with each other.

11. A face image recognition method used in a face image recognition apparatus including a feature amount registration section in which identification information configured by characters of plural digits assigned to at least one registrant and a reference feature amount of at least one registrant corresponding to the identification information are previously registered as registration information, comprising:

inputting a face image of a to-be-recognized person, extracting a face feature amount of the to-be-recognized person based on the input face image, permitting the to-be-recognized person to input his own identification information configured by characters of plural digits for each digit by use of an operation key, and recognizing the face image of the to-be-recognized person by collating the face feature amount extracted based on the input face image with a reference feature amount as registration information of a number reduced and selected from the feature amount registration section based on identification information of at least one digit input each time the identification information is input by one digit by use of the operation key, wherein said recognizing the face image of the to-be-recognized person includes holding identification information as a recognition result when recognition by use of the face image is successfully made before all of the digits of the identification information are input by use of the operation key, and determining whether or not the identification information held as the recognition result and the identification information input by the to-be-recognized person coincide with each other when the to-be-recognized person inputs all of the digits of the identification information by use of the operation key.

12. A passage control method used in a passage control apparatus including a feature amount registration section in which identification information configured by characters of plural digits assigned to at least one person who is permitted to pass through and a reference feature amount of at least one person corresponding to the identification information are previously registered as registration information, comprising:

inputting a face image of a passer, extracting a face feature amount of the passer based on the input face image, permitting the passer to input his own identification information configured by characters of plural digits for each digit by use of an operation key, recognizing the face image of the passer by collating the face feature amount extracted based on the input face image with a reference feature amount as registration information of a number reduced and selected from the feature amount registration section based on identification information of at least one digit input by use of the operation key each time the identification information is input by one digit by use of the operation key, and controlling the passage of the passer based on the recognition result obtained by said recognizing the face image of the passer, wherein said recognizing the face image of the passer includes holding identification information as a recognition result when recognition by use of the face image is successfully made before all of the digits of the identification information are input by use of the operation key, and determining whether or not the identification information held as the recognition result and the identification information input by the passer coincide with each other when the passer inputs all of the digits of the identification information by use of the operation key.

* * * * *